(12) United States Patent
Fuller et al.

(10) Patent No.: US 8,832,077 B1
(45) Date of Patent: Sep. 9, 2014

(54) SELECTIVELY RETRIEVING SEARCH RESULTS IN ACCORDANCE WITH DIFFERENT LOGICAL RELATIONSHIPS

(75) Inventors: Alfred R. K. Fuller, Menlo Park, CA (US); Max C. Ross, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 67 days.

(21) Appl. No.: 13/118,264

(22) Filed: May 27, 2011

Related U.S. Application Data

(60) Provisional application No. 61/482,591, filed on May 4, 2011.

(51) Int. Cl.
*G06F 17/30* (2006.01)

(52) U.S. Cl.
USPC .......................................... 707/716; 707/718

(58) Field of Classification Search
USPC .......................................... 707/715, 716, 718
See application file for complete search history.

(56) References Cited

U.S. PATENT DOCUMENTS

| | | | |
|---|---|---|---|
| 5,560,007 A * | 9/1996 | Thai ...................................... | 1/1 |
| 5,745,890 A | 4/1998 | Burrows | |
| 6,105,019 A | 8/2000 | Burrows | |
| 6,289,334 B1 | 9/2001 | Reiner et al. | |
| 6,963,869 B2 | 11/2005 | Burrows | |
| 7,043,469 B2 | 5/2006 | Goralwalla et al. | |
| 7,406,460 B2 | 7/2008 | Burrows | |
| 7,467,163 B1 | 12/2008 | Dodds et al. | |
| 7,689,550 B2 | 3/2010 | Lee et al. | |
| 8,099,422 B2 | 1/2012 | De Bellis | |
| 8,560,509 B2 | 10/2013 | Xia et al. | |
| 2003/0140035 A1 | 7/2003 | Burrows | |
| 2004/0167904 A1 | 8/2004 | Wen et al. | |
| 2004/0243569 A1 | 12/2004 | Burrows | |
| 2005/0055355 A1 | 3/2005 | Murthy et al. | |
| 2005/0228792 A1 | 10/2005 | Chandrasekaran et al. | |
| 2006/0031811 A1 | 2/2006 | Ernst et al. | |
| 2006/0271556 A1 | 11/2006 | Mukherjee et al. | |
| 2010/0042602 A1 | 2/2010 | Smyros et al. | |
| 2011/0119249 A1 * | 5/2011 | Flatz et al. ..................... | 707/714 |
| 2011/0225167 A1 | 9/2011 | Bhattacharjee et al. | |
| 2011/0246498 A1 | 10/2011 | Forster | |
| 2013/0282765 A1 | 10/2013 | Bhattacharjee et al. | |

OTHER PUBLICATIONS

Scharlock, Designing Composite Indexes, Sep. 26, 2008.*
Explain Extended, Descending indexes, Apr. 27, 2009.*
deciperinfosys, Column Order in a Composite Index, May 13, 2008.*
PostgreSQL, PostgreSQL 8.1.3 Documentation, May 4, 2006.*
Ben-Gan, Descending Indexes, Index Ordering, Parallelism, and Ranking Calculations, SQL Server Pro, May 24, 2010, 7 pgs.

* cited by examiner

*Primary Examiner* — James Trujillo
*Assistant Examiner* — William Spieler
(74) *Attorney, Agent, or Firm* — Morgan, Lewis & Bockius LLP

(57) ABSTRACT

A search server system having one or more processors and memory receives a search query including filter criteria. The filter criteria specify operands and a logical relationship. In response to the search query the server identifies index portions sorted in a same sort order. The server identifies matching entities that match the search query by identifying index entries having a first identifier and matching filter(s) of a first operand and identifying, index entries having a second identifier that is sequentially adjacent to the first identifier in the sort order and matching filter(s) of a second operand. When index portion(s) associated with the first operand include index entries having a respective identifier between the first identifier and the second identifier and matching the filter(s) of the first operand, the server marks a respective entity associated with the respective identifier as matching the search query and sends search results to the client.

23 Claims, 13 Drawing Sheets

Figure 4C

Index AC 142-AC (sorted by A, C, Key)

| A= | C= | Key= |
|---|---|---|
| 0 | bar | 0 |
| 0 | bar | 2 |
| 0 | foo1 | 7 |
| 0 | foo7 | 3 |
| 1 | bar | 4 |
| 1 | bar | 6 |
| 1 | foo1 | 5 |
| 1 | foo7 | 1 |

Index Portion (for A=0)
Index Portion (for A=1)

Index BC 142-BC (sorted by B, C, Key)

| B= | C= | Key= |
|---|---|---|
| 0 | bar | 0 |
| 0 | bar | 2 |
| 0 | bar | 4 |
| 0 | foo1 | 5 |
| 0 | foo7 | 1 |
| 1 | bar | 6 |
| 1 | foo1 | 7 |
| 1 | foo7 | 3 |

Index Portion (for B=0)
Index Portion (for B=1)

Index CA 142-CA (sorted by C, A, Key)

| C= | A= | Key= |
|---|---|---|
| bar | 0 | 0 |
| bar | 0 | 2 |
| bar | 1 | 4 |
| bar | 1 | 6 |
| foo1 | 0 | 7 |
| foo1 | 1 | 5 |
| foo7 | 0 | 3 |
| foo7 | 1 | 1 |

Index Portion (for C="bar")
Index Portion (for C="foo1")
Index Portion (for C="foo7")

SELECTIVELY RETRIEVING SEARCH RESULTS IN ACCORDANCE WITH DIFFERENT LOGICAL RELATIONSHIPS

RELATED APPLICATIONS

This application claims priority to U.S. Provisional Patent Application No. 61/482,591, filed May 4, 2011, entitled "Selectively Retrieving Search Results in Accordance with Predefined Sort Criteria" which is incorporated herein by reference in its entirety.

This application is related to U.S. patent application Ser. No. 13/118,254 filed on May 27, 2011 entitled "Selectively Retrieving Search Results in Accordance with Predefined Sort Criteria," which application is incorporated by reference herein in its entirety.

This application is related to U.S. patent application Ser. No. 13/118,277, now U.S. Pat. No. 8,392,408, filed on May 27, 2011 entitled "Coordinating Successive Search Queries using a Query Cursor," which application is incorporated by reference herein in its entirety.

This application is related to U.S. patent application Ser. No. 13/118,284, now U.S. Pat. No. 8,380,704, filed on May 27, 2011 entitled "Coordinating Different Search Queries using a Translated Query Cursor," which application is incorporated by reference herein in its entirety.

FIELD OF THE INVENTION

The present invention relates generally to the field of distributed client-server computer network systems, and in particular, to a system and method for efficiently searching a large number of entities.

BACKGROUND OF THE INVENTION

Every day, people submit millions of search queries, many of which are transmitted over communication networks to search server systems. Users have come to expect nearly instantaneous search results (e.g., search results that are produced with very low latency) when performing search queries even when searching through large data sets.

Conventional approaches to processing search queries tend to have search times that scale with the size of the data set over which the search is being performed. More specifically, in many conventional search implementations, the entire index is searched for index entries matching the search query. Thus, in these implementations indexes for large data sets require a search over a larger number of index entries. Moreover, when a search query includes multiple operands, typically an intermediate result set including representations of all of the data items matching each operand is pulled into memory and compared with intermediate result sets for other operands in accordance with the search query. For a large data set, these intermediate result sets can be very large, and consequently, using conventional approaches to processing search queries is inefficient and unduly time consuming. These and other problems with conventional approaches to processing search queries described above are reduced or eliminated by the systems and methods described below.

SUMMARY

It would be advantageous to provide a system and method for selectively retrieving search results in response to a search query, where the time required to perform the search query scales roughly with the size of the result set rather than the size of the overall data set. In particular, an approach that avoids pulling large intermediate result sets into memory would be particularly advantageous and would dramatically reduce latency and increase efficiency of performing search queries over large sets of data. Such an approach has an additional advantage that the latency can be easily controlled by adjusting the number of search results requested (e.g., reducing the number of search results requested reduces search time by a corresponding amount). For example, if only twenty search results can be displayed (e.g., on a search result page or in an email inbox), the search query can stop once twenty results (the twenty most relevant search results or twenty most recent email messages) have been retrieved, thereby limiting the search time to the search time required to produce twenty search results without regard to the size of the set of data or even the ultimate size of the result set.

In some embodiments, a method is performed at a server system having one or more processors and memory storing one or more programs for execution by the one or more processors so as to perform the method. The method includes receiving a search query including filter criteria and sort criteria. The filter criteria specify a plurality of operands including a first operand associated with one or more filters, a second operand associated with one or more filters and a logical relationship between the plurality of operands. The sort criteria specify a set of one or more predefined sort parameters and corresponding sort directions for sorting index entries in a predefined sort order. The method further includes, in response to the search query identifying a plurality of index portions for the filter(s) of the first operand and the filter(s) of the second operand, where index entries in the plurality of index portions are sorted in the predefined sort order, and each respective index entry in the plurality of index portions includes an identifier representative of a value for the predefined sort parameter and a unique identifier for a respective entity associated with the respective index entry. The method also includes identifying one or more matching entities that match the search query, including identifying matching index entries in the plurality of index portions in accordance with the logical relationship between the plurality of operands by comparing identifiers for index entries matching the filter(s) of the first operand with identifiers for index entries matching the filter(s) of the second operand and sequentially retrieving the identifiers for the matching index entries corresponding to matching entities from the plurality of index portions in the predefined sort order. After identifying the matching entities, the method includes transmitting representations of one or more of the matching entities to the client.

In some embodiments, a method is performed at a server system having one or more processors and memory storing one or more programs for execution by the one or more processors so as to perform the method. The method includes receiving, from a client, a search query including filter criteria. The filter criteria specify a plurality of operands including a first operand associated with one or more filters, a second operand associated with one or more filters and a logical relationship between the plurality of operands. The method further includes, in response to the search query identifying a plurality of index portions including a first set of one or more index portions matching the filter(s) of the first operand and a second set of one or more index portions matching the filter(s) of the second operand, where index entries in the first set of index portion(s) and the second set of index portion(s) are sorted in a same sort order in accordance with identifiers for the index entries. The method also includes identifying one or more matching entities that match the search query, including identifying a first set of one or more index entries in the first set of index portion(s) having a first identifier and matching the filter(s) of the first operand, identifying, in the second set of index portion(s), a second set of one or more index entries having a second identifier that is sequentially adjacent to the first identifier in the sort order and matching the filter(s) of the second operand. The method also includes, when the first set of index portion(s) includes a respective set of one or more index entries having a respective identifier between the first identifier and the second identifier and matching the filter(s) of the first operand, marking a respective entity associated with the respective identifier as matching the search query. After identifying the matching entities, the method includes transmitting representations of one or more of the matching entities to the client.

In some embodiments, a method is performed at a server system having one or more processors and memory storing one or more programs for execution by the one or more processors so as to perform the method. The method includes receiving, from a client, a search query including filter criteria, where the filter criteria specify a plurality of operands including a first operand associated with one or more filters, a second operand associated with one or more filters and a logical relationship between the plurality of operands. The method further includes, in response to the search query identifying a plurality of index portions including a first set of one or more index portions matching the filter(s) of the first operand and a second set of one or more index portions matching the filter(s) of the second operand, where index entries in the first set of index portion(s) and the second set of index portion(s) are sorted in a same sort order in accordance with identifiers for the index entries. The method also includes identifying one or more matching entities that match the search query by identifying a plurality of candidate identifiers including a respective candidate identifier for each respective operand in the plurality of operands. The identifying includes identifying, in the first set of index portion(s), a first set of one or more index entries having a first identifier with a value closest to a predefined end of a range of identifier values in the first set of index portion(s) and matching the filter(s) of the first operand, where the first identifier comprises the respective candidate identifier for the first operand. The identifying also includes identifying, in the second set of index portion(s), a second set of one or more index entries having a second identifier with a value closest to the predefined end of the range of identifier values in the second set of index portion(s) and matching the filter(s) of the second operand, where the second identifier comprises the respective candidate identifier for the second operand. The method further includes, after the identifying, comparing the plurality of candidate identifiers to each other to identify a candidate identifier that is closest to the predefined end of the range of identifier values. When the first identifier is the candidate identifier closest to the predefined end of the range of identifier values, the method includes marking an entity associated with the first identifier as matching the search query and identifying, in the first set of index portion(s), a third set of one or more index entries having a third identifier that is sequentially adjacent to the first identifier in the sort order and matching the filter(s) of the first operand. When the second identifier is the candidate identifier closest to the predefined end of the range of identifier values, the method includes marking an entity associated with the second identifier as matching the search query and identifying, in the second set of index portion(s), a fourth set of one or more index entries having a fourth identifier that is sequentially adjacent to the second identifier in the sort order and matching the filter(s) of the second operand. After identifying the matching entities, the method includes transmitting representations of one or more of the matching entities to the client.

In some embodiments, a method is performed at a server system having one or more processors and memory storing one or more programs for execution by the one or more processors so as to perform the method. The method includes receiving, from a client, a first search query, and in response to the first search query generating a first set of search results corresponding to the first search query by searching in a first set of one or more index portions and generating a query cursor corresponding to the search query, where the query cursor indicates a location, in the first set of index portions, of a respective index entry corresponding to a respective result in the first set of search results. The method further includes sending, to the client, a representation of at least a portion of the first set of search results and the query cursor. After sending the query cursor to the client, the method includes receiving, from the client, a second search query including the query cursor and in response to the second search query, generating a second set of search results corresponding to the second search query by searching in a second set of one or more index portions starting at a location in the second set of index portions identified using the query cursor and sending, to the client, a representation of at least a portion of the second set of results. The first search query is different from the second search query and/or the second set of index portions includes at least one index portion not included in the first set of index portions.

In some embodiments, a method is performed at a server system having one or more processors and memory storing one or more programs for execution by the one or more processors so as to perform the method. The method includes receiving, from a client, a current search query including a query cursor corresponding to a prior search query, the query cursor corresponding to a location in a first set of one or more index portions used to perform the prior search query and in response to the current search query decomposing the query cursor into a plurality of components and generating a translated query cursor corresponding to the received search query using one or more of the components. After generating the translated query cursor, the method includes identifying a location in a second set of one or more index portions to start performing the current search query based the translated query cursor and generating a set of search results corresponding to the current search query by searching in the second set of index portions starting at the identified location. After generating the set of search results, the method includes sending, to the client, a representation of at least a portion of the set of search results.

In accordance with some embodiments, a computer system (e.g., a search client system or search server system) includes one or more processors, memory, and one or more programs; the one or more programs are stored in the memory and configured to be executed by the one or more processors and the one or more programs include instructions for performing the operations of the method described above. In accordance with some embodiments, a non-transitory computer readable storage medium has stored therein instructions which when executed by one or more processors, cause a computer system (e.g., a search client system or search server system) to perform the operations of the methods described above.

BRIEF DESCRIPTION OF THE DRAWINGS

For a better understanding of the disclosed embodiments, reference should be made to the Description of Embodiments below, in conjunction with the following drawings in which like reference numerals refer to corresponding parts throughout the figures.

FIG. 4C is a block diagram illustrating a set of indexes for different properties for a plurality of entities having multiple properties and unique identifiers (keys), where the indexes are sorted in accordance with values of one of the properties, in accordance with some embodiments.

DESCRIPTION OF EMBODIMENTS

The present invention is directed to a client-server system and corresponding method of organizing, storing and indexing information (e.g., entities) so as to enable the information to be efficiently retrieved in response to search queries.

Figure 1:
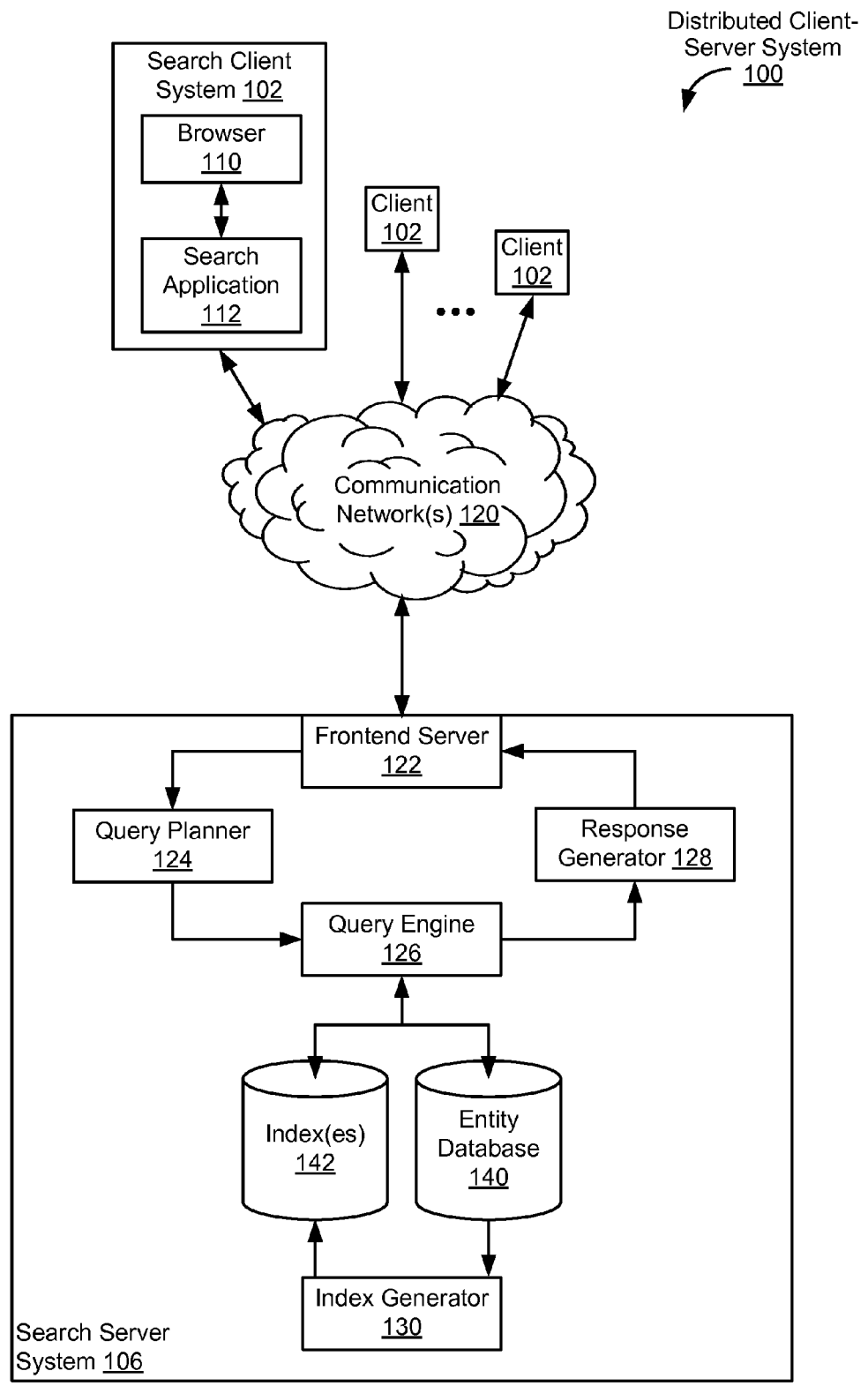
FIG. 1 is a block diagram illustrating a distributed client-server system, in accordance with some embodiments.

FIG. 1 includes a block diagram illustrating an exemplary distributed client-server system 100 for performing searches data. System 100 includes one or more Search Client System(s) 102 (also referred to herein as "Client 102"), a Search Server System 106 (also referred to herein as "Server 106") and a Communication Network 120 for connecting Clients 102 to Search Server System 106. Communication Network 120 optionally includes the Internet, one or more local area networks (LANs), one or more wide area networks (WANs), other types networks, or a combination of such networks.

A Client 102 optionally includes a Browser 110 and a Search Application 112. Browser 110 can be a general purpose Internet browser (sometimes called a Web browser) having a browser window used for displaying a search query entry interface and search query results. Search query results are, optionally rendered by Browser 110 using hypertext markup language (HTML) or any other appropriate rendering methodology. Alternatively, a search query is, optionally, submitted via a stand-alone Search Application 112. After a user submits a request for representations of entities matching a search query through Browser 110 or a stand-alone Search Application 112, Client 102 relays the request to Server 106 via Communication Network 120. Server 106 identifies a plurality of matching entities and transfers search results including representations of the matching entities and, optionally, a set of display information back to Client 102. Search Application 112 and/or Browser 110 uses the search results and display information to render a set of search results at Client 102.

Search Server System 106 includes Frontend Server 122, Query Planner 124, Query Engine 126, Response Generator 128, Index Generator 130, Entity Database 140 and one or more Indexes 142. Index Generator 130 processes information about the entities that is stored in Entity Database 140 to produce Indexes 142 for use by Query Engine 126 when performing a search query. Alternatively or in addition, Index Generator 130 retrieves information about entities from a remote source such as a remote database or web crawler that systematically retrieves information from a plurality of remote sources (e.g., websites). These operations are typically performed by Index Generator 130 prior to receiving the search query at Server 106. Performing these processes prior to receiving the search query increases the speed with which search results can be retrieved, thereby reducing latency of the search operation and returning results to users more quickly. In addition, Index Generator 130 typically continues to update Indexes 142 in between queries.

Frontend Server 122 relays requests from Clients 102 to Query Planner 124, which optionally plans a search query by selecting an order to apply filters and sort orders specified in the search query and transmits the planned search query to Query Engine 126. The Query Planner 124 plans the search query so as to improve the performance characteristics of the search query (e.g., by determining an order to apply filters that reduces the time to perform the search query and/or reduces the maximum or total processor usage). Alternatively, Query Planner 124 is optionally part of the Search Application, which transmits the search query along with information specifying an order to apply filters and sort orders directly to Frontend Server 122, which are subsequently transmitted to Query Engine 126. Query Engine 126 identifies, in Indexes 142, indexes and index portions adapted for responding to the search query and performs the search query on the identified indexes and/or index portions to identify search results.

Typically, the matching entities are identified one at a time or in small batches in a predefined order (e.g., an order defined by the search query or a system defined order). Thus when the indexes and/or index portions are sorted by a predefined property such as relevance or recency, Query Engine 126 can easily retrieve the twenty most relevant/recent results and then stop searching the identified indexes or index portions. After identifying matching entities, Query Engine 126 retrieves information about the matching entities from Entity Database 140 and passes the information to Response Generator 128. Response Generator 128 generates a response including at least a portion of the information about the matching entities. Response Generator 128 also, optionally, determines display information for the search results. The search results and, optionally, display information passed to Frontend Server 122, which in turn passes the results to Client 102 via Communication Network 120 for display at Client 102 (e.g., via Browser 110 or Search Application 112).

Figure 2:
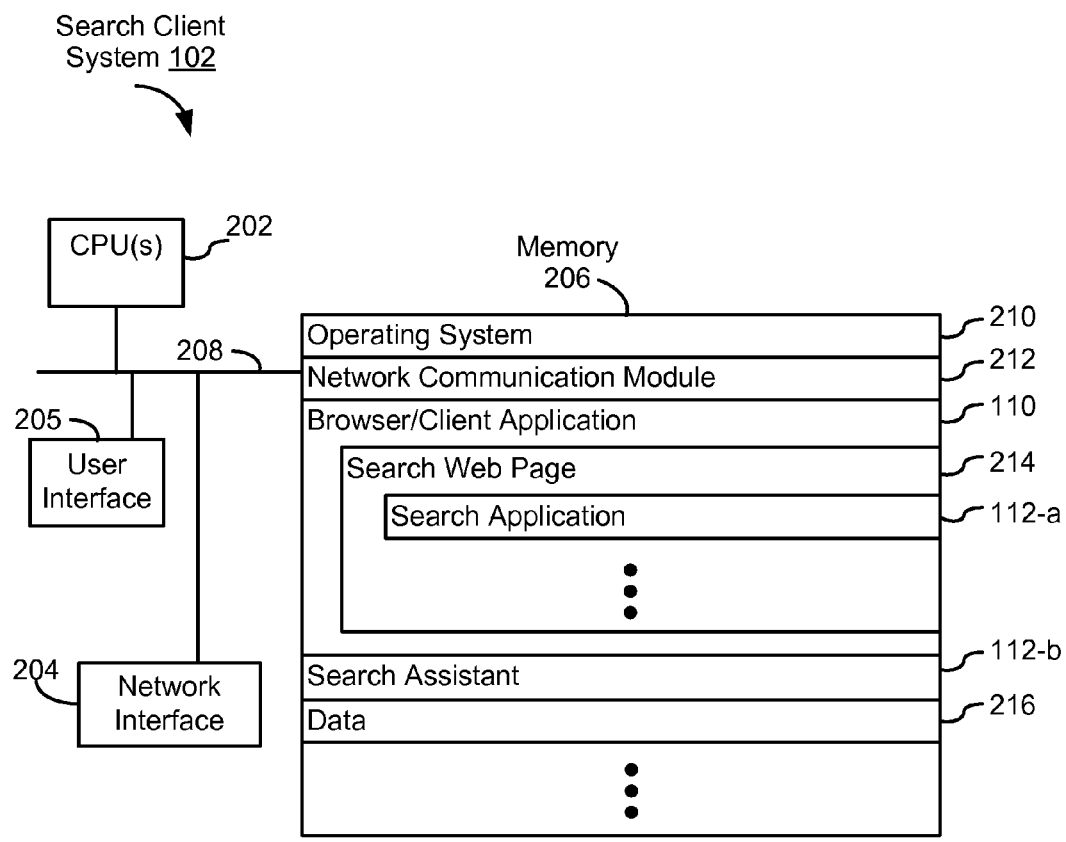
FIG. 2 is a block diagram illustrating a search client system, in accordance with some embodiments.

FIG. 2 is a block diagram illustrating a Search Client System 102 in accordance with some embodiments. Client 102 typically includes one or more processing units CPU(s) 202, one or more network or other Communication Interfaces 204, Memory 206 a User Interface 205 comprising a display device and a keyboard, mouse, touchpad, touchscreen or other input device, and one or more Communication Buses 208 for interconnecting these components. Memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 206 optionally includes one or more storage devices remotely located from the CPU(s) 202. Memory 206, or alternatively the non-volatile memory device(s) within Memory 206, comprises a non-transitory computer readable storage medium. In some embodiments, Memory 206 or alternatively the non-transitory computer readable storage medium stores the following programs, modules and data structures, or a subset thereof:

- an Operating System 210 that includes procedures for handling various basic system services and for performing hardware dependent tasks;
- a Network Communication Module (or instructions) 212 that is used for connecting Search Server System 102 to other computers (e.g., Search Server System 106 or Other Message Server Systems 108) via one or more Network Interfaces 204 (wired or wireless) and one or more Communication Networks 120 (FIG. 1), such as the Internet, other wide area networks, local area networks, metropolitan area networks, and so on;
- a Web Browser 110 for loading web pages such as a Search Web Page 214, which optionally includes code for executing a Search Application 112-a as an embedded application in Search Web Page 214, where Search Application 112-a sends requests to Server 106 and displays data received from Server 106;
- a dedicated Search Application 112-b (e.g., a stand-alone email client) for sending requests to Server 106 and displaying data received from Server 106; and
- optionally, Data 216 such as cached search data (e.g., recently accessed search results, recent search queries, etc.), stored query cursors generated at Client 102 or received from Server 106 along with search results from one or more prior search queries.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 206 optionally stores a subset of the modules and data structures identified above. Furthermore, Memory 206 may stores additional modules and data structures not described above.

Figure 3:
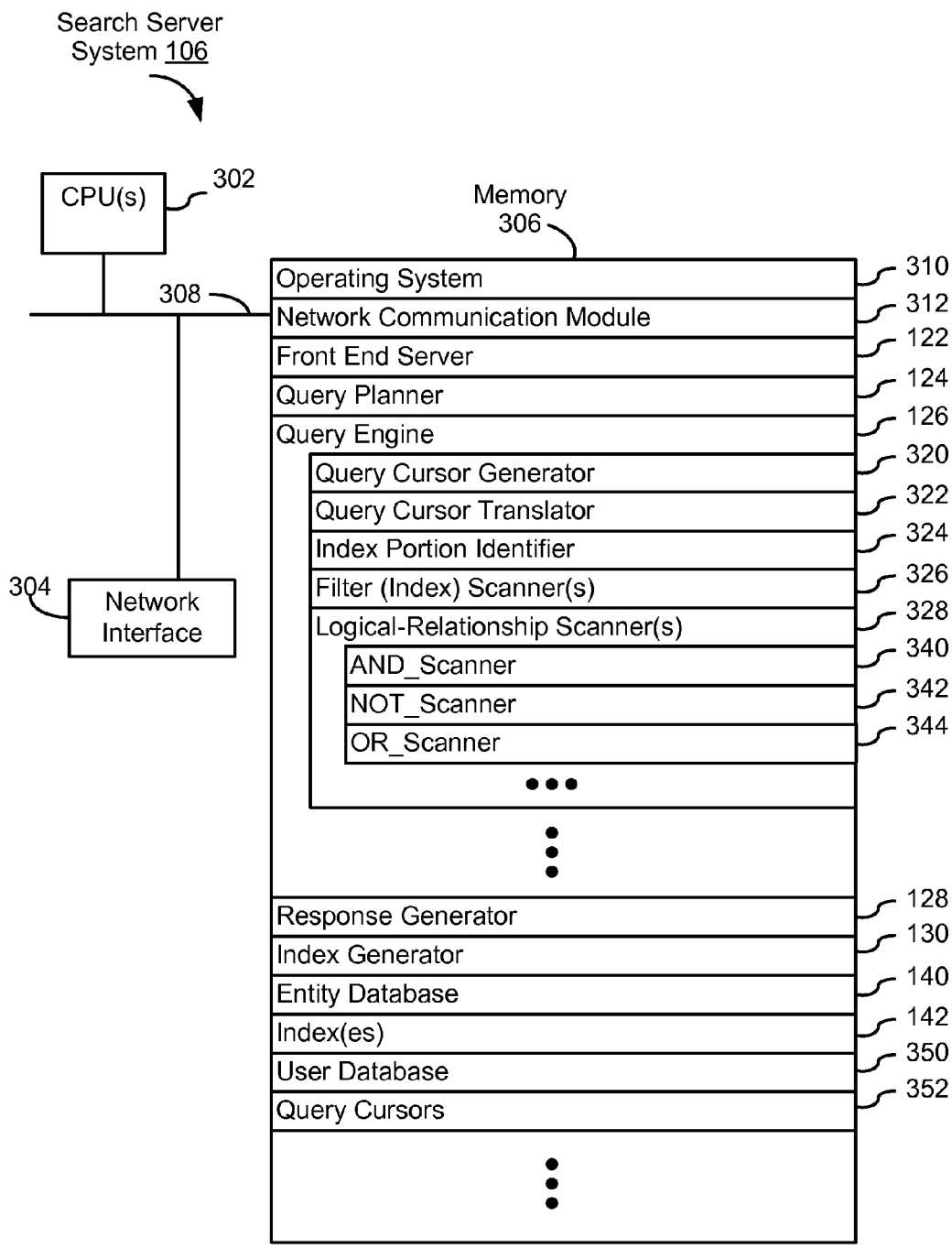
FIG. 3 is a block diagram illustrating a search server system, in accordance with some embodiments.

FIG. 3 is a block diagram illustrating a Search Server System 106 in accordance with some embodiments. Search Server System 106 typically includes one or more processing units CPU(s) 302, one or more network or other Communications Interfaces 308, Memory 306, and one or more Communication Buses 308 for interconnecting these components. Memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 306 optionally includes one or more storage devices remotely located from the CPU(s) 302. Memory 306, or alternatively the non-volatile memory device(s) within Memory 306, comprises a non-transitory computer readable storage medium. In some embodiments, Memory 306 or alternatively the non-transitory computer readable storage medium stores the following programs, modules and data structures, or a subset thereof:

- an Operating System 310 that includes procedures for handling various basic system services and for performing hardware dependent tasks;
- a Network Communication Module (or instructions) 312 that is used for connecting Server 106 to other computers (e.g., Client 102) via one or more Network Interfaces 304 (wired or wireless) and one or more Communication Networks 102 (FIG. 1), such as the Internet, other wide area networks, local area networks, metropolitan area networks, and so on;
- a Frontend Server 122 for coordinating communication between Server 106, Clients 102 and any other computer systems with which Server 106 communicates;
- a Query Planner 124 for converting a search query received from Client 102 into a search query to be executed by Query Engine 126; for multi-step search queries, the converting optionally includes revising the order and/or composition of the steps so as to improve the speed and/or efficiency of performing the search query (e.g., by reducing the number of required index scans and/or performing steps that are likely to eliminate a large number of non-matching entities earlier in the search process);
- a Query Engine 126 for performing the search query by identifying index portions and searching the index portions using the search query;
  - a Query Cursor Generator 320 for generating a query cursor that indicates a location in the index portions in at which Query Engine 126 stopped retrieving identifiers for matching index entries, the query cursor is, optionally, sent along with results to serve as a "bookmark" if the Client decides to resume the search at the stopping point;
  - a Query Cursor Translator 322 for receiving, along with a new search query, a query cursor generated in response to a prior search query, decomposing the query cursor and determining a corresponding new query cursor that indicates a location in index portions associated with the new search query corresponding to a stopping point in the index portions associated with the prior search query;
  - an Index Portion Identifier 324 for identifying index portions that are adapted for responding to a search query (e.g., index portions that match all of the filters of a search query and are sorted in same sort order, such as a sort order specified by the search query);
  - one or more Filter (Index) Scanners 326 for scanning through an index or index portion to retrieve an identifier of one or more next matching results (e.g., matching index entries that are sequentially adjacent to the last matching index entry or query cursor position in the sort order) in the index or index portion;

one or more Logical-Relationship Scanners 328 for retrieving identifiers of matching entities from the index portions identified by Index Portion Identifier 324 in accordance with the received search query, the Logical-Relationship Scanners 328 typically include one or more of an AND_Scanner 340 (described in greater detail below with reference to FIGS. 6A-6B), a NOT_Scanner 342 (described in greater detail below with reference to FIG. 7) and an OR_Scanner (described in greater detail below with reference to FIG. 8);

a Response Generator 128 for organizing information concerning matching entities identified by Query Engine 126 and generating display information to be transmitted to Client 102, where the display information specifies formatting of the search results at Client 102;

an Index Generator 130 for generating indexes for use in executing search queries, in some implementations Index Generator 130 generates a large number of indexes (e.g., at least one index for each property that can be used to sort and/or filter search results) so that for each possible combination of filters and sort orders in a search query, there exists an index including an index portion where the index entries matching the combination of filters are arranged in a contiguous block of index entries sorted in the sort order;

optionally, an Entity Database 140 storing entities or information about entities;

one or more Indexes 142 which store information about entities and properties of the entities, typically the Indexes 142 are each sorted in accordance with values of the properties for the entities, as described in greater detail below with reference to FIGS. 4A-4C;

optionally, a User Database 350 storing information about users and user search preferences, in some embodiments when the entities are user specific (e.g., a collection of a user's photos, emails or other documents), the user database identifies which entities and indexes the user has authority to access, the User Database 350, optionally, stores other user account information; and optionally, Query Cursors 352 received from Client 102 or generated by Query Cursor Generator and sent to Client 102 in response to prior search queries, alternatively query cursor are not stored at Server 106 and are instead received from Client 102 on an as needed basis in conjunction with requests to perform search queries using the query cursors.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 306 optionally stores a subset of the modules and data structures identified above. Furthermore, Memory 306 optionally stores additional modules and data structures not described above.

Although FIG. 3 shows a "Search Server System" 106 FIG. 3 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement a Search Server System 106 and how features are allocated among them will vary from one implementation to another, and optionally depends in part on the amount of data traffic that the system must handle during peak usage periods as well as during average usage periods.

Entities and Indexes

Figure 4A:
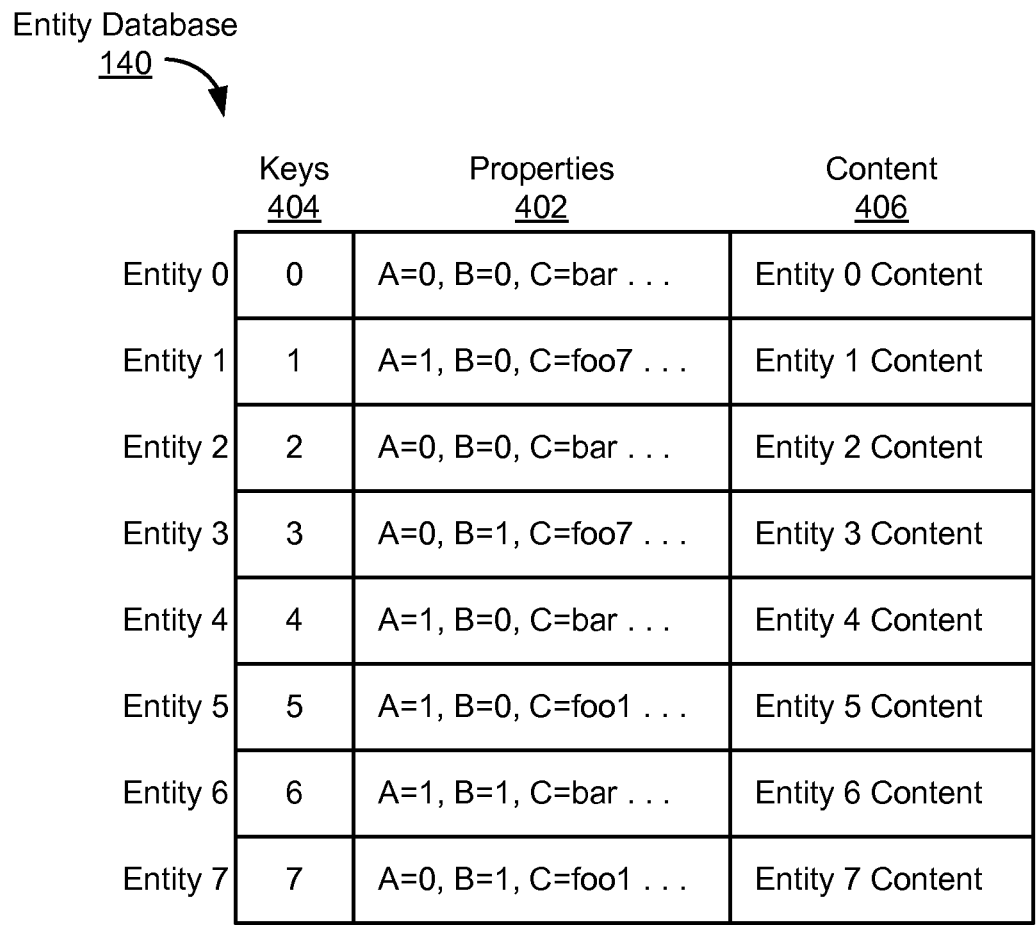
FIG. 4A is a block diagram illustrating an entity database storing information about entities having properties, unique identifiers (keys) and content, in accordance with some embodiments.

FIG. 4A illustrates an entity database storing information about entities (data objects) having keys 402 (unique identifiers), properties 404 and content 406 of the entities according to some embodiments. An entity has one or more properties, each property having one or more possible values of different types, including one or more of: integers, floating point values, strings, dates, and binary data. A property can have one or more values. For example, the property "tag" for a particular entity could have a value for each tag associated with the particular entity (e.g., "vacation" "mom" "California," etc. could all be values for the property "tag"). A property with multiple values can have values of mixed types (e.g., for a particular entity a property could have one value that is an integer and another value that is a string). In some implementations, a search query including a filter (e.g., property=value) for a property with multiple values tests whether any of the values meets the filter. Thus, in these implementations, if a respective entity includes properties A=1 and A=2, a search for all entities with the property A=1 will return the respective entity. Additionally, it should be understood that the values of these properties can be used either as predefined sort parameters or to determine whether respective entities meet filter criteria.

Each entity also has a key that uniquely identifies the entity, also called a "unique identifier" for the entity. In some implementations, a key is simply an Entity ID that is associated with the entity (e.g., assigned by Server 106). In other implementations the key includes a kind and the Entity ID. The kind categorizes the entity so that it can more easily be identified and retrieved. An entity can be requested by Client 102 either by submitting a request for an entity associated with a particular key, or by requesting performance of a search query that matches the entity's properties. A search query that matches the entities properties will typically first produce the key for the matching entity and then retrieve the entity or information representative of the entity from Entity Database 140. Unlike some conventional relational databases, in some implementations, Entity Database 140 does not require that all entities of a given kind have the same properties.

Figure 4B:
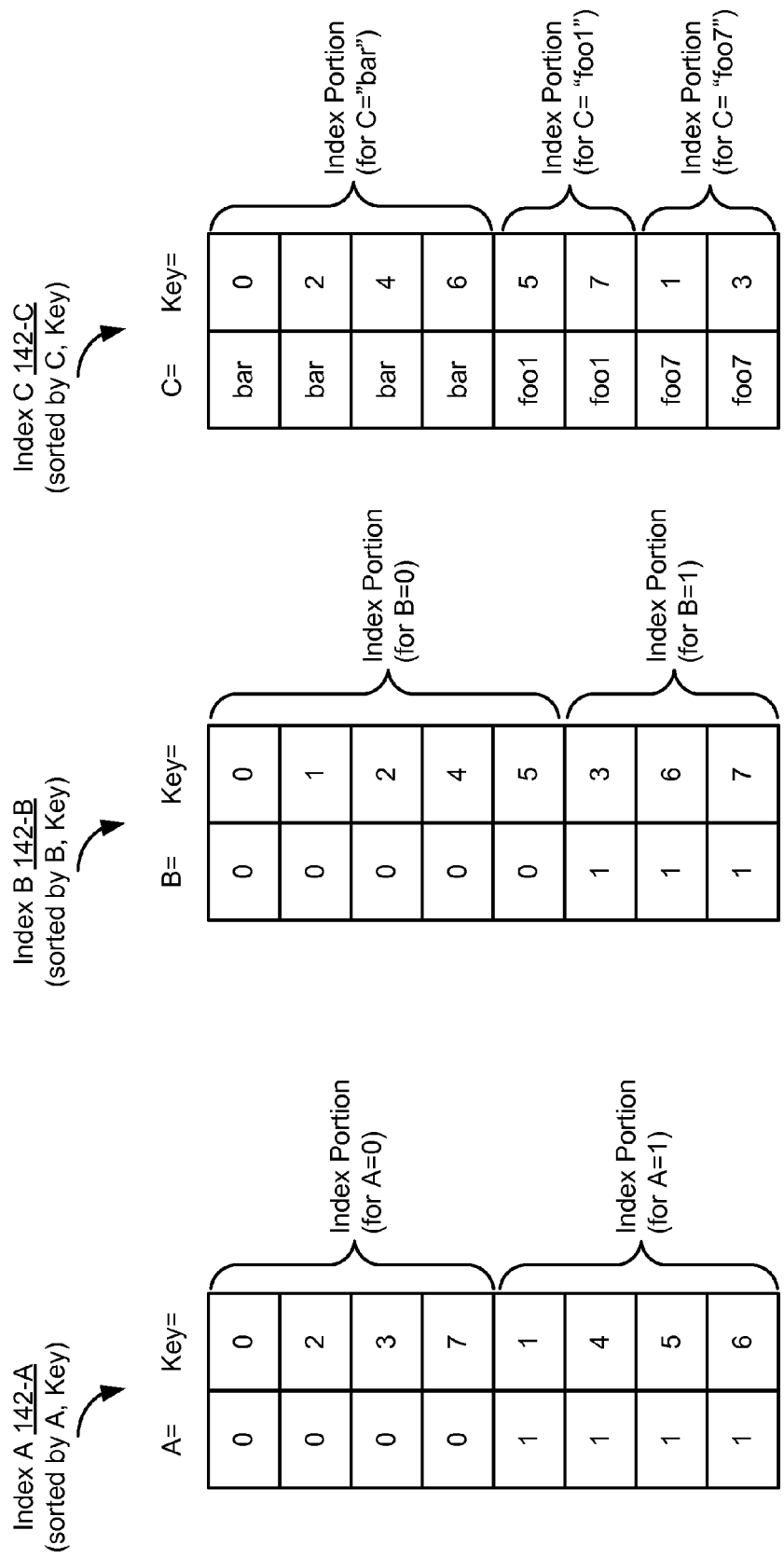
FIG. 4B is a block diagram illustrating a set of indexes for different properties for a plurality of entities having multiple properties and unique identifiers (keys), in accordance with some embodiments.

FIG. 4B illustrates exemplary Indexes 142 for different properties for a plurality of entities having multiple properties and unique identifiers (keys). The indexes (Index A 142-A, Index B 142-B and Index-C 142-C) illustrated in FIG. 4B are for responding to queries that do not have custom (user specified or system specified) sort order. Thus, each index has a plurality index entries (rows) sorted in accordance with values of a property and a key (columns). In some implementations, there is an index entry for each value of a property of an entity. Thus, if there is a multi-valued property, there will be at least two index entries for the entity (e.g., two index entries in the same index with the same key but different filter values), one sorted in accordance with the first value of the property and another sorted in accordance with the second value of the property.

Each of the exemplary indexes in FIG. 4B is adapted for responding to queries including a filter for the respective property included in the index (e.g., A, B, or C for Index A 142-A, Index B 142-B or Index C 142-C, respectively). The indexes include portions that are indicated by the values of the property. For example, Index A 142-A has two portions, a portion where A=0 and a portion where A=1, and these portions are internally contiguous portions (e.g., a contiguous set of index entries where A=0 and a contiguous set of index entries where A=1) because Index A 142-A is sorted in accordance with the values of property A. Similarly, Index B 142-B also has two portions, a portion where B=0 and a portion where B=1, and these portions are internally contiguous portions (e.g., a contiguous set of index entries where B=0 and a contiguous set of index entries where B=1) because Index B 142-B is sorted in accordance with the values of property B. Index C 142-C is sorted in a similar manner, but has three different portions because there are three different values for property C, the portions for Index C 142-C include: a portion where C=bar, a portion where C=foo1, and a portion where C=foo7, and these portions are internally contiguous portions because Index C 142-C is sorted alphabetically in accordance with the values of property C. Also, it should be understood that each of the index portions are internally sorted in a default sort order (e.g., the index entries within a portion are sorted by key, which is not typically a user selected sort order, as the values of the keys are not usually known by the user and frequently do not correspond to any property that is relevant to the user).

When a search query is received, indexes are selected to perform the search query based on the properties that are included in the index. Moreover, when processing a search query specifying a filter, Server 106 (or Query Engine 126 of Server 106) only needs to look for index entries matching the search query in the portion of the index matching the filter, because the index is sorted so that index entries in all other sections of the index do not match the filter and thus are irrelevant to the search query. For example, for a search query including the filter A=0, results (e.g., identifiers of index entries) will only be retrieved from the portion of Index A that corresponds to A=0, and the portion of Index A where A=1 will be ignored. Thus, in some embodiments, for each property for which a search can be performed, there is an index that is sorted in accordance with values of that property.

In one implementation, Server 106 provides search services for a plurality of different applications, and each application has its own set of indexes for performing search queries. In these implementations each application defines its indexes in a configuration file. Additionally, indexes for some types of commonly received queries are optionally provided automatically by Server 106. During development of the application, Server 106 can automatically add suggestions for new indexes to create to the configuration file when it encounters a search query that cannot be performed because indexes adapted for performing the search query have not been created. Additionally, a developer of the application can manually specify indexes to be created in anticipation of search queries that are likely to be executed by the application. As the entities in Entity Database 140 are updated, Server 106 (or Index Generator 130) updates the indexes (e.g., by updating the values for properties for the entities when the entities are modified). When a user requests that the application execute a search query, the search query is passed to Server 106, which generates search results using indexes corresponding to the search query.

In some circumstances, multiple index portions will be used to respond to a single search query (e.g., when a search query such as A=1 AND B=1, A=1 NOT B=1, or A=1 OR B=1 is performed both Index A 142-A and Index B 142-B are used to respond. When multiple indexes are used, it is important for many of the embodiments described herein that the index portions used to perform the search query are all sorted in a same sort order, as will be described in greater detail below. In cases where there is no sort order specified by the search query, a default sort order can be used. For example, in FIG. 4B, all of the index portions are sorted by primary key in ascending order. However, when a custom sort order (e.g., sorting by a values of one or more of the properties, such as date or relevance) is part of the search query, the indexes must include indexes with index portions sorted in the custom sort order.

FIG. 4C illustrates exemplary Indexes 142 for different properties for a plurality of entities having multiple properties and unique identifiers (keys), where the indexes are sorted in a custom sort order. The indexes (Index AC 142-AC, Index BC 142-BC) illustrated in FIG. 4C are for responding to queries that have a custom sort order (e.g., sorted alphabetically by values of property C). This custom sort order is merely exemplary and it should be understood that a set of indexes can be generated that is adapted for responding to search queries that have any custom sort order on values of any property or any combination of values of different properties (e.g., date descending and relevance descending). Thus, each index has index entries (rows) sorted in accordance with values of two properties and a key (columns). In some implementations, there is an index entry for each combination of values of a properties of an entity. Thus, if there is a multi-valued property, there will be at least two index entries for the entity (e.g., two index entries in the same index with the same identifier but different filter values), one sorted in accordance with the first value of the property and another sorted in accordance with the second value of the property.

Each of the exemplary indexes in FIG. 4C is adapted for responding to queries including a filter for the respective property included in the index (e.g., A or B for Index AC 142-AC or Index BC 142-BC, respectively). Index 142-AC includes portions that are indicated by the values of A and are sorted in a sort order in accordance with values of property C. Index 142-BC includes portions that are indicated by the values of B and are sorted in a sort order in accordance with values of property C. Index 142-CA includes portions that are indicated by the values of C and are sorted in a sort order in accordance with values of property A. For example, similar to Index A 142-A in FIG. 4B, Index AC 142-AC has two portions, a portion where A=0 and a portion where A=1, and these portions are internally contiguous portions because Index A 142-AC is sorted in accordance with the values of property AC. However, unlike Index A 142-A, where the index portions were sorted only by key, in Index AC 142-C the index portions are sorted by values of property C and key. In an analogous manner, similar to Index B 142-B in FIG. 4B, Index BC 142-BC also has two portions, a portion where B=0 and a portion where B=1, and these portions are internally contiguous portions because Index BC 142-BC is sorted in accordance with the values of property BC. However, unlike Index B 142-B, where the index portions were sorted only by key, in Index BC 142-C the index portions are sorted by values of property C key. In an analogous manner, similar to Index C 142-C in FIG. 4B, Index CA 142-CA also has three portions, a portion where C=bar, a portion where C=foo1, and a portion where C=foo7, and these portions are internally contiguous portions because Index CA 142-CA is sorted in accordance with the values of property C. However, unlike Index C 142-C, where the index portions were sorted only by key, in Index BC 142-C the index portions are sorted by values of property A and key. Thus, the sort order of several of the index portions in FIG. 4C is different from the sort order of the index portions in FIG. 4B.

As described in greater detail above, in some circumstances, multiple index portions will be used to respond to a single search query (e.g., when a search query such as A=1 AND B=1 (sort by C), A=1 NOT B=1 (sort by C), or A=1 OR B=1 (sort by C) is performed both Index AC 142-AC and Index BC 142-BC are used to respond to the search query. While this simple example has been provided with respect to indexes having a single filter criteria and a single sort order, it should be understood that, in principle, a set of indexes can be created that is adapted for responding to a search query with any combination of filter criteria and sort orders. More generally, for a search query having one or more filters and zero or more sort orders, an index adapted for responding to the search query will include a column for each property used in a filter or sort order. The rows are sorted by the following aspects, in order: property values used in equality filters property values used in inequality filters property values used in sort orders. Additionally, it should be understood that a given index could be adapted for responding to multiple different queries. For example the index adapted for responding to a search query of the form: A=value, B=value, C=value, sort by D and E would also be adapted for responding to a search query of the form: A=value, B=value, sort by C, D and E or responding to a search query of the form: A=value, B=value, C=value, D=value, minvalue<E<maxvalue.

While, in many circumstances, this index generation scheme will entail the creation of a large number of indexes so that there is an index adapted for performing each of the likely search queries that can be requested by a client, there are certain advantages to maintaining this set of indexes. For instance, the sorting of the indexes puts all index entries matching every possible search query that uses an index in consecutive rows in the index. Consequently, once a first index entry is found that matches all of the filters of a search query, all of the index entries in the index that match the search query will be ordered consecutively in the index in the sort order of the index. Thus, Server 106 can quickly identify subsequent matching index entries without searching through the whole index (e.g., by sequentially stepping through index entries row by row). Moreover, if the next index entry in the index does not match all of the filters, then Server 106 has confirmation that the index does not contain any other matching index entries. As a result of using the index generation scheme describe herein will usually result in a dramatic increase in efficiency and speed when performing a search query at the cost of some additional processing to generate the indexes prior to receiving the search query.

However, given the large number of indexes that are likely created to account for all of the possible queries that may be submitted to Server 106, it is advantageous in some implementations to specify a subset of properties (unindexed properties) that will not be searched on. This will decrease the amount of computing resources that are used to generate, update and store the indexes, because Server 106 will not need to maintain index entries for the unindexed properties in the indexes.

In the following descriptions, reference will occasionally be made to an identifier that is "sequentially adjacent" to an identifier in an index portion or set of index portions. As used herein, a second identifier in an index portion or set of index portions is "sequentially adjacent" to a first identifier (e.g., a previously retrieved identifier), even when the first identifier is not present in the index portion or set of index portions, when the second identifier is the next higher identifier, for ascending order, or the next lower identifier, for descending order, in the index portion or set of index portions that matches the filter(s) of the second operand (e.g., in the sequence 1, 4, 6, 9, 13, the value "9" is sequentially adjacent to "7" in the ascending direction and the value "6" is sequentially adjacent to "7" in the descending direction). For example, in the index portion of index 142-A where A=0 in FIG. 4B, the key "2" is sequentially adjacent to "3" in the descending direction and the key "5" is sequentially adjacent to "3" in the ascending direction. Similarly, the in the index portion of index 142-B in FIG. 4B where B=0, the key "2" is sequentially adjacent to "3" in the descending direction and the key "4" is sequentially adjacent to "3" in the ascending direction.

Searching Indexes

Figure 5:
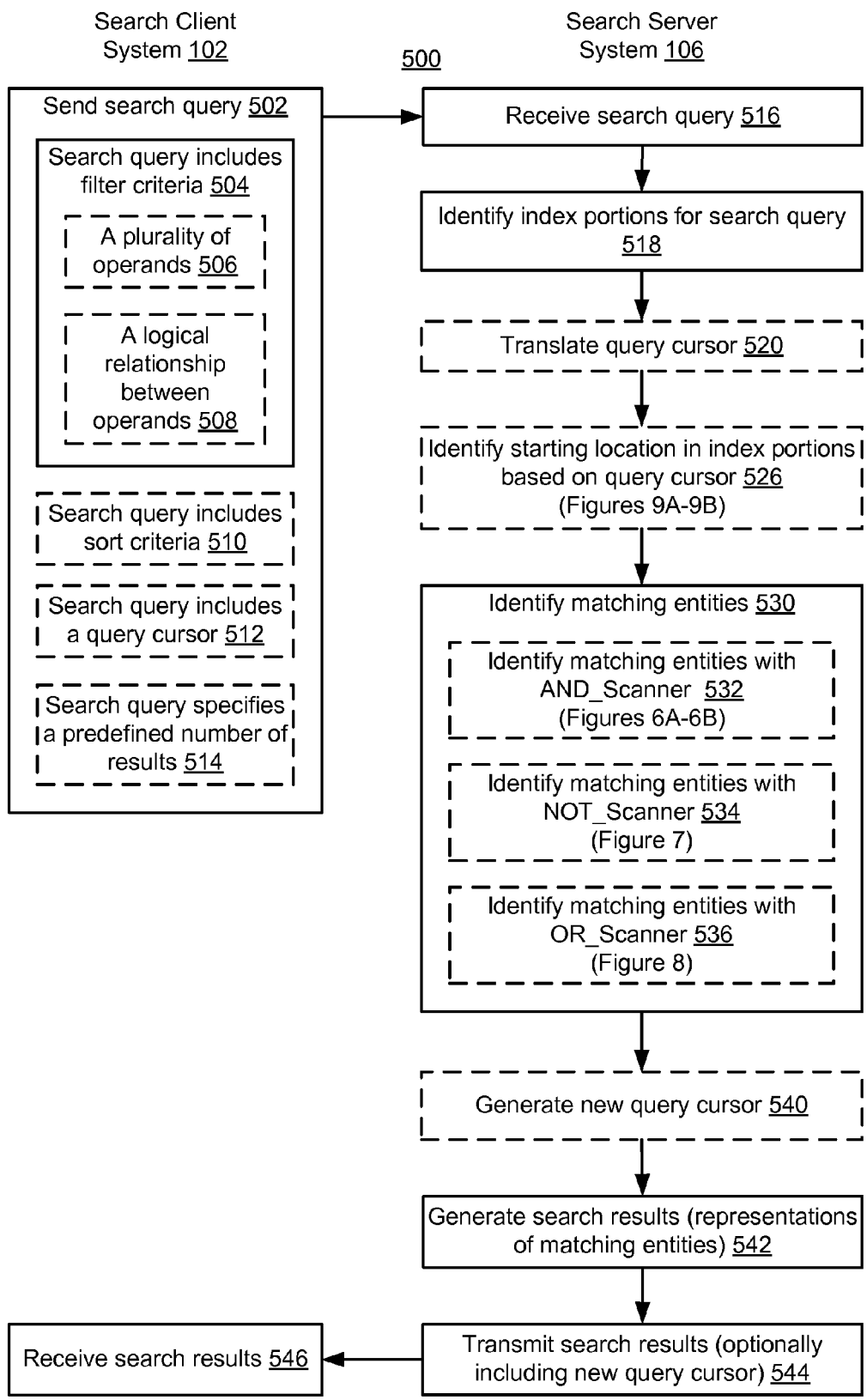
FIG. 5 includes a flow chart illustrating a method for receiving and processing queries at a search server system and returning search results, in accordance with some embodiments.

FIG. 5 includes a flowchart representing a method 500 for receiving and processing queries at a search server system, according to certain embodiments. Method 500 is, optionally, governed by instructions that are stored in a non-transitory computer readable storage medium and that are executed by one or more processors of one or more servers (e.g., Server 106, FIG. 3). Each of the operations shown in FIG. 5 may correspond to instructions stored in a computer memory or computer readable storage medium (e.g., memory 306 of Server 106 in FIG. 3). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in method 500 may be combined and/or the order of some operations may be changed.

Search Client System 102 sends (502) a search query to Search Server System 106. The search query includes filter criteria (504) which optionally specify a plurality (506) of operands including a first operand associated with one or more filters, a second operand associated with one or more filters and a logical relationship (508) between the plurality of operands.

The filters optionally include one or more of equality filters (e.g., property=value), inequality filters (e.g., property >, < or ≠ value) and range filters (e.g., a concatenation of multiple inequality filters). In some implementations, each search query includes at most a single inequality or range filter. However, if a search query including multiple inequality/range filters is received by Server 106, Query Planner 124 optionally converts the search query into two or more search queries that each include no more than a single inequality or range filter, and the queries are processed separately (e.g., in parallel or serially). Due to the sorting of the index portions described above, a contiguous index portion that matches all of the filter criteria can only be guaranteed when one or more equality filters are paired with a single inequality or range filter, and the index is sorted by the values of the properties for the equality filters before the values of the property for the inequality/range filter.

To perform a search for a search query including inequality or range filter, the portion(s) of the index(es) for the search query are identified as follows. To identify particular index portion, first a candidate region of an index that matches all of the equality filters and is sorted in accordance with values of the property for the inequality/range filter is identified. In other words, the inequality/range filter property is a first property in the sort criteria for the candidate region of the index.

Subsequently, within the candidate region of the index, an index portion that includes values of the property for the inequality/range filter is identified. As the candidate region of the index has been sorted in ascending or descending order in accordance with values of the property for the inequality/range filter, the index entries for a continuous range of values are guaranteed to be consecutive in the index. A range filter is typically a concatenation of multiple inequality filters. For example, a range filter minvalue<A<maxvalue can be rewritten as minvalue<A and maxvalue>A.

In some implementations the logical relationship between the plurality of operands is one of a Boolean "OR," a Boolean "AND" and a Boolean "NOT." However, it should be understood that other logical relationships could be used without departing from the scope of the present disclosure. In some implementations an arbitrary expression tree using combinations of AND, OR and NOT can be generated by using the results of a logical-relationship scanner as an operand for another logical-relationship scanner. For example where there is an AND_Scanner represented as AND(operand 1, operand 2, . . . ), a NOT_Scanner represented as NOT(operand 1, operand 2) and an OR_Scanner represented as OR(operand 1, operand 2, . . . ), the search query A AND NOT(B AND C AND (D OR E)) where A-E are index scans for index entries matching one or more filters would be represented as: NOT (A, AND(B, C, OR(D, E))).

As used herein, an operand is a scanner on which a mathematical or logical operation is performed. A scanner is a routine that sequentially returns identifiers for index entries matching predefined criteria, which optionally includes filter scanners or logical-relationship scanners. A filter scanner for a respective filter sequentially retrieves, in the sort order, identifiers for index entries that match the respective filter from an index portion associated with the respective filter. In other words, a filter scanner retrieves sequential identifiers from a single index portion that matches all of the filter criteria. A logical-relationship scanner sequentially retrieves identifiers for index entries that match a logical relationship between index entries sequentially retrieved by a combination of two or more scanners each selected from the group consisting of a filter scanner and another logical-relationship scanner. In other words, a logical-relationship scanner is another scanner that retrieves results from multiple indexes and optionally includes one or more operands that are additional logical-relationship scanners. It should be understood that this schema can be used to generate queries of arbitrary complexity by using different types of scanners as operands.

A more detailed description of an implementation of an equality filter is described below. In this implementation, index entries are divided between a prefix and a postfix wherein the prefix for an index entry is based on all of the equality filters and the postfix is based on values of properties of the index entry that are used for sorting, inequality filters and/or range filters. For a filter scanner with an equality filter of A=0 Server 106 specifies a prefix on an index. For example A=0 is imposed by setting a prefix of 0 on an index that has A as its first indexed column. Thus only the portion of the index with index entries that have A=0 is considered. Additionally, from each index entry that matches the given prefix, a postfix can be extracted. In some cases this postfix is simply the key (unique identifier) associated with an entity that satisfies the given constraint, however the postfix can also contain one or more additional components (e.g., components representative of values of properties used for sorting and/or inequality/range filters). Since the indexes are sorted by the values of the properties, the postfixes resulting from a linear index scan on the portion of the index prefixed by the given constraint are also sorted (as they are all prefixed by the same values). Thus the first postfix that is greater than a given minimum value (or less than a given maximum value) of a particular scan is the next result that should be returned by the filter scanner. In some implementations, each constraint on an index entry's columns is represented by a filter scanner. Additionally, the results from multiple filter scanners can typically be aggregated to impose more complicated constraints (e.g., A=1 AND B=0 AND C=bar).

As described in greater detail below, in some implementations, a filter scanner is executed using the following steps. Server 106 identifies an index adapted for responding to the search query, the index corresponding to the search query's kind, filter properties, filter operators, and sort orders. After identifying an index adapted for responding to the search query Server 106 starts scanning the index at the first index entry that meets all of the filter conditions using the search query's filter values (e.g., the beginning of the index portion matching the search query). After identifying the matching index portion, Sever 106 steps through the index entries of the matching index portion, sequentially returning each index entry, until it finds the next index entry that does not meet the filter conditions, reaches the end of the index, or has collected identifiers from enough index entries to satisfy the maximum number of results requested by the search query. In some implementations, after stopping the search query, Server 106 notes the stopping point and generates a query cursor to enable Server 106 to resume the search query from the stopping point, as described in greater detail below with reference to FIGS. 9A-9B.

The search query optionally also includes sort criteria (510) (e.g., the sort criteria specified by Client 102). In some implementations, the sort criteria specify that the results for the search query be sorted in an order in accordance with values of a property that is of interest to a user. In the absence of user-specified sort criteria, the indexes are typically sorted by at least a key (unique identifier) so as to ensure a common default sort order between different index portions. However, the sort criteria described herein are sort criteria specified in the search query. These sort criteria include a set of one or more predefined sort parameters and corresponding sort directions for sorting index entries in a predefined sort order. It should be understood that search results can be sorted in accordance with any combination of one or more predefined properties and directions (e.g., a sort order could specify Age: Descending, LastName: Ascending, and FirstName: Ascending or any combination or subset thereof). A sort direction for a particular predefined sort parameter could be any one of ascending, descending, or scatter. A scatter order is a pseudo-random ordering; work can be distributed across multiple portions of a large database table (e.g., a database table stored and/or managed by multiple servers) by accessing entities in (or writing new entities into) the database table using an index or index portion having a scatter sort order. The predefined sort parameter included in the sort criteria from the search query can be any one of a date, an alphanumeric string (e.g., name, location, etc.), or a measure of relevance. Values for the predefined sort parameter are typically in any one of the following formats: Integer, Floating point number, String, Point, Key. The following are examples of parameter, value type pairs indicating for a respective parameter, the type of value that would be expected: FirstName: String, LastName: String, Height: Floating point number, Age: Integer, Date: Integer, Location: Point, ClassID: Integer.

In some circumstances, the sort criteria will specify a single predefined sort parameter and a single corresponding sort direction. In these situations, the plurality of index portions will be sorted in the sort direction in accordance with values of the single predefined sort parameter, and identifiers will be retrieved from the plurality of index portions in an order determined by the values of the single predefined sort parameter in the plurality of index portions. In some other situations, the sort criteria specify multiple predefined sort parameters and multiple corresponding sort directions, and the plurality of index portions are sorted in the predefined sort order in accordance with values of the multiple predefined sort parameters and the corresponding sort directions.

In some circumstances the search query will also include (512) a query cursor, the query cursor is, optionally, used to identify a starting location for executing the search query, as described in greater detail with respect to FIGS. 9A-9B, below. In some circumstances the search query also specifies (514) a predefined maximum number of results to return, which may correspond to a maximum number of results that can be simultaneously displayed at Client 102 or an arbitrary number of results selected by the user or Client 102 so as to reduce the search time.

Server 106 receives (516) a search query including filter criteria and sort criteria. In response to the search query Server 106 identifies (518) a plurality of index portions for the filter(s) of the first operand and the filter(s) of the second operand. The index portions are identified such that index entries in the plurality of index portions are sorted in the predefined sort order (which, as described above can be based on any number of different sort directions for any number of different properties). In some implementations, each respective index entry in the plurality of index portions includes an identifier representative of a value for the predefined sort parameter and a unique identifier (e.g., key) for a respective entity associated with the respective index entry.

In some implementations, when the search query includes a query cursor, prior to identifying the matching entities, Server 106 translates (520) the query cursor and determines (526) a starting location in the identified index portions based on the query cursor, as described in greater detail with respect to FIGS. 9A-9B, below.

It should be understood that even though, in some circumstances, the overall sort order of each of the indexes used to perform a particular search query is different for different respective indexes, the index portions that are used to perform the particular search query are all sorted in the same sort order. For example, a first index is sorted by a set of properties (e.g., A and C) that is different from a set of properties used to sort a second index (e.g., B and C), but if the search query is A=1 and B=0, then the portion of the index sorted by A and C that matches A=1 is sorted by C and the portion of the index sorted by B and C that matches B-0 is also sorted by C. In other words, in some circumstances the plurality of index portions include a first index portion identified in a first index and a second index portion identified in a second index, the first index is different from the second index, the first index has a different overall sort order than the second index, and the first index portion and the second index portion are sorted in the predefined sort order.

In some implementations, each filter specifies a property having a plurality of different possible values and a particular value of the property that matches the filter (e.g., filter is an equality filter where an index entry matches the filter when property=particular value). In these implementations, identifying a respective index portion for a respective operand that has a respective filter and one or more predefined sort parameters includes: identifying an index that is sorted in accordance with the different possible values of a respective property of the respective filter and the one or more predefined sort parameters (e.g., the filter is an equality filter where an index entry matches the filter when property=particular value) and selecting, as the respective index portion, a portion of the identified index that includes all of the index entries having the particular value for the respective property that matches the filter. Usually, the index will be sorted so that the identified portion of the index is a contiguous portion of the index. Additionally, it should be understood that a portion of an index could include the whole index (e.g., where every index entry in the index happens to match the one or more filters of the operand). For example if the index includes a column for values of A, which has possible values of 1 or 0 and all of the indexed entities happen to have the value of A=1, then a filter of A=1 will return the entire index as the "index portion." However an index will usually have multiple portions because the index will include index entries with different values for the properties by which the index is sorted (e.g., there will be at least one index entry with A=1 and another index entry with A=0).

As described above, there are typically many different properties by which indexes can be sorted, and many different combinations of properties. Thus, the predefined sort order specified by the search query is generally only one of a plurality of different sort orders. Similarly, the plurality of index portions can, in some situations (e.g., where the search query specifies filters on two different properties, such as "name" and "tag") be selected from a plurality of indexes (e.g., an index including a column for values of "name" and an index including a column for values of "tag"). In some implementations, the plurality of indexes include at least one distinct index for each of the plurality of sort orders (e.g., an index including a column for values of "name" sorted by date and a distinct index including a column for values of "name" sorted by size and yet another distinct index including a column for values of "name" sorted by relevance). More particularly, in some embodiments, there is a distinct index for each sort order of the plurality of different sort orders (e.g., the plurality of index portions are selected based on the sort order specified by the sort criteria). Typically, each index used in generating results for a search query must include all the sort orders (e.g., indexes that don't contain the exact sort order not considered). Thus, when a search query is received with a particular sort order specified by the sort criteria, only indexes that include index portions sorted in the sort order are considered. For example, when a search query is: Name="Bob" And Tag="Vacation," sorted by date, Server 106 would use two date-sorted indexes to respond to the search query, including an index including a column for values of "name" sorted by date and an index including a column of values of "tag" sorted by date. In contrast, if the a search query were: Name="Bob" And Tag="Vacation," sorted by size, Server 106 would use two size-sorted indexes to respond to the search query including an index including a column for values of "name" sorted by size and an index including a column of values of "tag" sorted by size.

Moreover, the plurality of indexes optionally include multiple different indexes that are sorted in accordance with the same properties but have different sort orders determined in accordance with a sequence in which the sorting occurs and a direction of the sorting. For example, there may be one index sorted by, in order: "date" descending and "relevance" descending and another index sorted by, in order "date" ascending and "relevance" descending. Thus, the one or more index portions optionally include an ascending index portion for the set of one or more predefined sort parameters in which index entries are sorted in accordance with ascending values of a particular predefined sort parameter (e.g., date) in the set of predefined sort parameters, and a descending index portion for the set of one or more predefined sort parameters in which index entries are sorted in accordance with descending values (e.g., date) of the particular predefined sort parameter in the set of one or more predefined sort parameters. Moreover, there are optionally other indexes sorted by, in order, "relevance" descending and "date" ascending.

After identifying the one or more index portions, Server 106 identifies (530) one or more matching entities that match the search query. The one or more matching entities are identified by identifying matching index entries in the plurality of index portions in accordance with the logical relationship between the plurality of operands by comparing identifiers for index entries matching the filter(s) of the first operand with identifiers for index entries matching the filter(s) of the second operand. In some implementations, the identifiers are postfixes, including the value(s) for the sort parameter(s) and a key (unique identifier) for an entity associated with the index entry. In some implementations, when the logical relationship includes a Boolean AND, Server 106 uses an AND_Scanner to identify (532) matching entities, as described in greater detail below with reference to FIGS. 6A-6B, below. In some implementations, when the logical relationship includes a Boolean NOT, Server 106 uses a NOT_Scanner to identify (534) matching entities, as described in greater detail below with reference to FIG. 7, below. In some implementations, when the logical relationship includes a Boolean OR, Server 106 uses an OR_Scanner to identify (536) matching entities, as described in greater detail below with reference to FIG. 8.

Server 106 sequentially retrieves the identifiers for the matching index entries corresponding to matching entities from the plurality of index portions in the predefined sort order. As described above, the index portions are selected such that they are sorted in the predefined sort order, consequently, when matching index entries are identified in the index portions by scanning sequentially through the index portions (e.g., using a filter scanner), the matching index entries are identified in the sort order. Thus the identifiers for matching entities can be identified in the index portions one at a time and will still be retrieved in the predefined sort order. One result of this approach is that full result sets matching the filter criteria do not need to be pulled into memory. This is particularly advantageous for searches performed over a large set of data where a result set for a simple filter scanner such as Tag=Vacation which would otherwise return thousands or hundreds of thousands of results. This also provides dramatic advantages over conventional search systems in situations where a search query specifies that no more than a predefined number of identifiers are to be retrieved, because in the search system described herein, Server 106 can retrieve no more than the predefined number of identifiers. For example, if the sort order is sort by date, the first ten search results retrieved by Server 106 will be the ten most recent entities matching the filter. It should be understood that results could be retrieved in batches (e.g., by retrieving the top 20 matching results) or the results could be retrieved individually as needed by a user (e.g., individual results could be retrieved one at a time as needed by repeating the search query to retrieve a next result each time a next result is needed).

In some implementations, when the last matching index entry has been identified, a new query cursor is generated (540) which marks the stopping point of the search query in the identified index portions. This query cursor enables Server 106 to resume executing the search query at the stopping point at a later point in time (e.g., in response to a request from Client 102) as described in greater detail with respect to FIGS. 9A-9B, below. Generating a new query cursor enables Server 106 to quickly pick up retrieving search results where it stopped previously, without wasting computing resources regenerating previously generated search results attempting to approximate a stopping point of a previous search query.

After identifying the one or more matching entities, Server 106 generates (542) search results including representations of matching entities and, optionally, display information for displaying the representations of matching entities as search results at Client 102. After generating the search results, Server 106 transmits (544) the search results (including representations of one or more of the matching entities and, optionally, the new query cursor) to Client 102. Client 102 receives (546) the search results that include the representations of matching entities, and displays the search results (or a subset of the search results) to the user.

It should be understood that this process can be repeated for each search query that is received from Client 102. Additionally, the same search query can be submitted multiple times with different query cursors so as to produce additional results. For example, a first execution of a search query with no query cursor might return the top ten most relevant results, while a second execution of the search query with a query cursor received with the previous search results would return the next ten most relevant/recent search results. Thus, using the query cursor in this way, a user can effectively "page forward" through sets of search results of decreasing relevance/recency for the search query, where a new search query is performed each time a the user "advances" to a next set of search results matching the search query. An analogous process enables the user to "page backward" through the search results. However, in some implementations (e.g., where the query cursor is sort order dependent) returning to previous sets of search results requires translation of the query cursor, as described in greater detail below with reference to FIGS. 9A-9B.

It should be understood that the particular order in which the operations in FIG. 5 have been described are merely exemplary and are not intended to indicate that the described order is the only order in which the operations could be performed. One of ordinary skill in the art would recognize various ways to reorder the operations described herein. Additionally, it should be noted that details of other processes described herein with respect to methods 600, 700, 800 and 900 (e.g., FIG. 6A-6B, 7, 8 or 9A-9B respectively) are also applicable in an analogous manner to method 500 described above with respect to FIG. 5. For example, the operands, matching entities, indexes, search queries, query cursors, and search results described above with reference to method 500 may have one or more of the characteristics of the various the operands, matching entities, indexes, search queries, query cursors, and search results described herein with reference to methods 600, 700, 800 and 900. For brevity, these details are not repeated here.

Identifying Matching Entities with an AND_Scanner

Figure 6A:
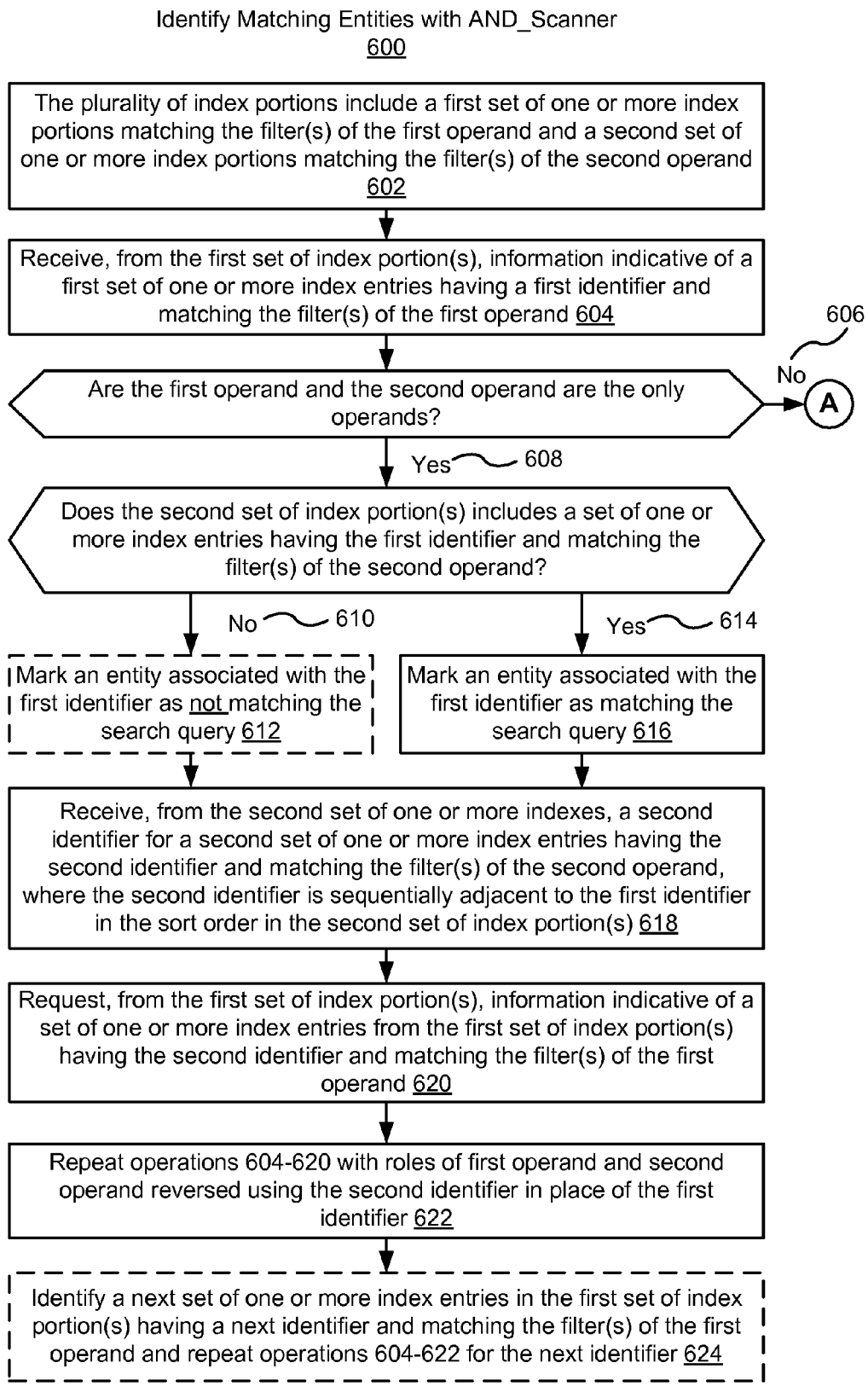
FIGS. 6A-6B include a flow chart illustrating a method for identifying matching entities in index portions of one or more indexes when a logical relationship between operands of a search query is a Boolean AND, in accordance with some embodiments.
Figure 6B:
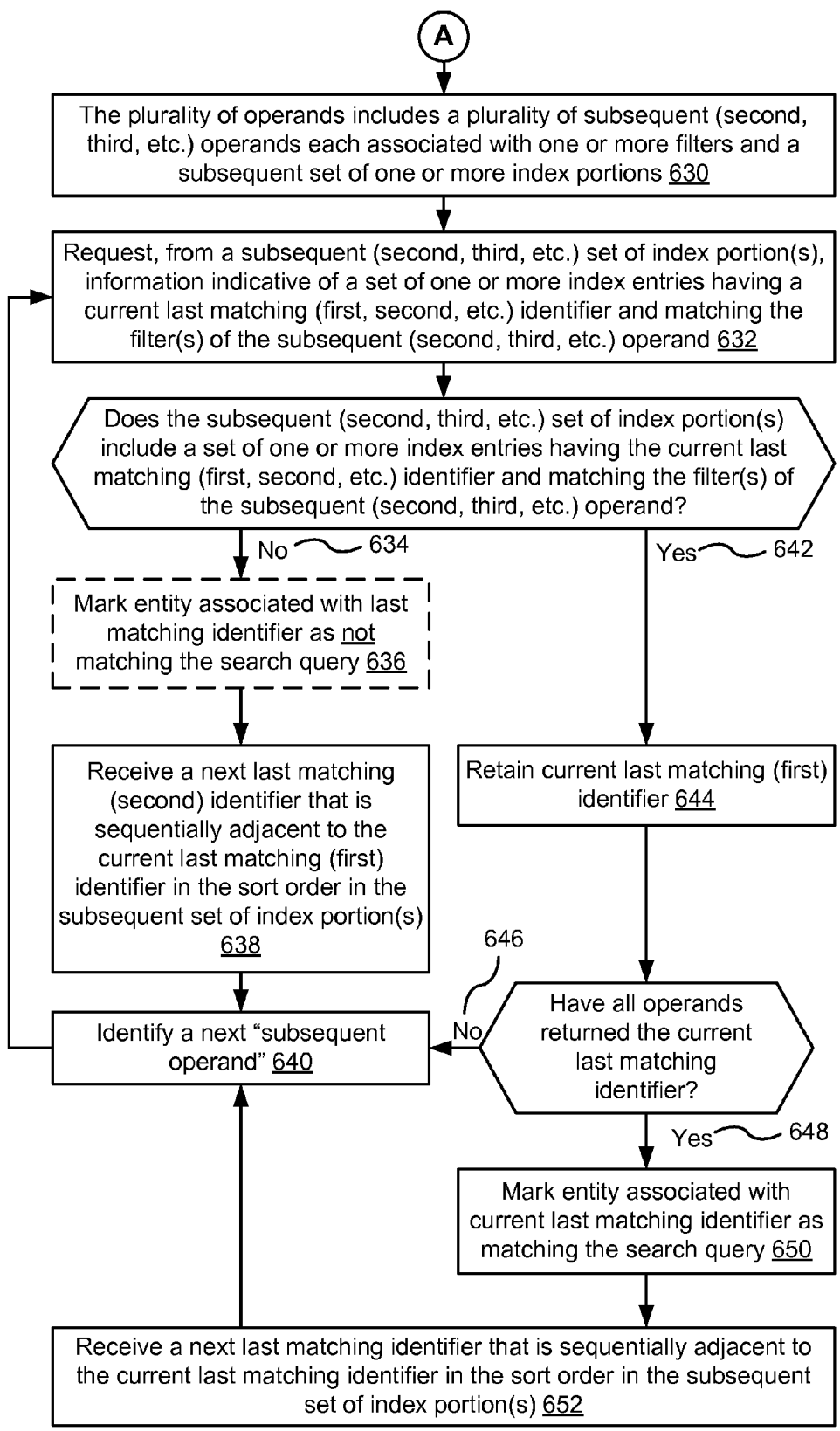

FIGS. 6A-6B includes a flowchart representing a method 600 for identifying matching entities in one or more indexes when a logical relationship between operands of a search query is a Boolean AND, according to certain embodiments. Method 600 is, optionally, governed by instructions that are stored in a non-transitory computer readable storage medium and that are executed by one or more processors of one or more servers (e.g., Server 106, FIG. 3). Each of the operations shown in FIGS. 6A-6B may correspond to instructions stored in a computer memory or computer readable storage medium (e.g., memory 306 of Server 106 in FIG. 3). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in method 600 may be combined and/or the order of some operations may be changed.

An AND_Scanner can be represented as an operator that includes a plurality of operands, such as AND(operand 1, operand 2, operand 3 . . . ). At a high level, an AND_Scanner loops through the scanners (e.g., filter scanners or logical-relationship scanners) associated with all of the operands until it finds a result that is returned by the scanner for each operand. The AND_Scanner can do this very efficiently by passing the result returned by the scanner for the immediately previous operand to the scanner for the next operand as the minimum value requested (e.g., as the starting point for searching in the index portion associated with the next operand). In this way, large numbers of index entries that are implicitly not matching (e.g., index entries having identifiers that were returned as results by prior operands) can be skipped by a current scanner, because the skipped index entries cannot match the AND logic if any of the operands do not return an identifier for the skipped index entries. For example, if the index portions are sorted by date descending and the search query is for Name="Bob" AND Tag="Vacation," if there are no entities associated with the name "Bob" prior to Apr. 2, 2011, then there cannot be any entities matching the search query prior to Apr. 2, 2011, and it is therefore more efficient to begin searching for entities with Tag="Vacation" starting at Apr. 2, 2011.

In some implementations, when the logical relationship is a Boolean AND (e.g., the one or more matching entities are identified by an AND_Scanner), the plurality of index portions include (602) a first set of one or more index portions matching the filter(s) of the first operand and a second set of one or more index portions matching the filter(s) of the second operand. It should be understood that the first set of one or more index portions and the second set of one or more index portions could include portions of the same index or portions of different indexes. For example, when the search query is for Name="Bob" AND Tag="Vacation," the first index portion would be a portion of an index including a column for values of Name where Name="Bob" and the second index portion would be a portion of a different index including a column for values of Tag where Tag="Vacation." In contrast, when the search query is Tag="Summer" AND Tag="Vacation," the first index portion would be a portion of an index including a column for Tag where Tag="Summer" while the second index portion is a portion of the same index including a column for Tag where Tag="Vacation."

As described in greater detail above with reference to FIG. 5, Server 106 identifies matching index entries in the plurality of index portions in accordance with the logical relationship between the plurality of operands. When using the AND_Scanner, identifying these matching index entries includes receiving, (604) from the first set of index portion(s), information indicative of a first set of one or more index entries having a first identifier and matching the filter(s) of the first operand. In other words, when the first operand is for a filter scanner, Server 106 identifies the first index entry in the index portion corresponding to the filter scanner that matches the filter criteria and returns an identifier for that index entry as a candidate identifier. Additionally, in more complicated situations (e.g., where the operand is a logical-relationship scanner), Server 106 simply retrieves the next matching result that is returned by the logical-relationship scanner. In some implementations identifiers for multiple sets of matching index entries are simultaneously retrieved to improve the efficiency and/or speed of retrieving results for the search query (e.g., the first 50 or 100 matching index entries from a filter scanner).

While it should be understood that the AND_Scanner can operate on any number (606) of operands, a simple implementation when only two (608) operands are used is described first for clarity. Various implementations of the AND_Scanner enabling searches using an arbitrary number of operands are described below in greater detail with reference to operations (630)-(652).

When the first operand and second operand are the only operands, Server 106 determines whether the second set of index portion(s) includes a set of one or more index entries having the first identifier and matching the filter(s) of the second operand. When the second set of index portion(s) does not (610) include a set of one or more index entries having the first identifier and matching the filter(s) of the second operand, Server 106 continues to process the search query without marking an entity associated with the first identifier as matching the search query (e.g., because the first set of index portions and the second set of index portions do not both include an index entry with the first identifier). In some implementations, in addition to continuing to process the search query without marking an entity associated with the first identifier as matching the search query, an entity is "marked as not matching" the search query by skipping over or discarding the identifier for index entries associated with the entity. For example, Server 106 could skip over identifiers for index entries associated with an entity by advancing the search to index entries with an identifier that is has a sequentially next value (greater than or less than depending on the sort direction) from the value of the respective identifier for the respective entity that is marked as not matching the search query.

In contrast, when the first operand and the second operand are the only operands, and the second set of index portion(s) includes (614) a set of one or more index entries having the first identifier and matching the filter(s) of the second operand, Server 106 marks an entity associated with the first identifier as matching the search query (e.g., because both the first set of index portions and the second set of index portions include an index entry with the first identifier). As used herein, "marking an entity" means recording information that indicates a specific condition with respect to the entity, either in the data structure containing the entity or in another data structure, such as an index or temporary results table.

In situations where the first operand and the second operand are the only operands, Server 106 receives (618), from the second set of index portion(s), a second identifier for a second set of one or more index entries having the second identifier and matching the filter(s) of the second operand, where the second identifier is sequentially adjacent to the first identifier in the sort order in the second set of index portion(s). As used herein, a second identifier in an index portion or set of index portions is "sequentially adjacent" to a first identifier, even when the first identifier is not present in the index portion or set of index portions, when the second identifier is the next higher identifier, for ascending order, or the next lower identifier, for descending order, in the index portion or set of index portions that matches the filter(s) of the second operand (e.g., in the sequence 1, 4, 6, 9, 13, the value "9" is sequentially adjacent to "7" in the ascending direction and the value "6" is sequentially adjacent to "7" in the descending direction).

After receiving the second identifier, Server 106 requests (620), from the first set of index portion(s), information indicative of a set of one or more index entries from the first set of index portion(s) having the second identifier and matching the filter(s) of the first operand. Thus, in this situation, Server 106 repeats (622) operations 604-620 with roles of first operand and second operand reversed using the second identifier in place of the first identifier 622. In other words, in these implementations, Server 106 is able to reverse the roles of the first operand and the second operand, and take the most recently retrieved identifier (the second identifier) from the second set of index portions and use that value as a starting point for searching the first set of index portions for an index entry having the second identifier or an identifier that is sequentially adjacent to the second identifier in the first set of index portions. This approach dramatically improves the efficiency of performing the search query in most cases, because it means that all of the index entries in the first set of index portions with identifiers between the first identifier and the second identifier, which have been implicitly identified as not matching the search query can easily be ignored (e.g., by searching the first set of index portions starting at the second identifier).

After repeating the previously described operations with the roles of the first and second operands reversed, Server 106 identifies (624) a next set of one or more index entries in the first set of index portion(s) having a next identifier and matching the filter(s) of the first operand and repeat operations 604-622 for the next identifier. Thus, the Server 106 has a new identifier from the first set of index portions and can proceed as described above. It should be understood that this process can be repeated until there are no more sets of index entries that match the filter(s) of the first operand in the first set of one or more index portions or until there are no more sets of index entries that match the filter(s) of the second operand in the second set of one or more index portions, in which case there can be no more index entries with identifiers that match search query that requires (e.g., due to the Boolean AND) that both the filters of the first operand and the filters of the second operand be met.

As mentioned above, in some implementations the AND_Scanner takes an arbitrary number of operands, enabling Clients 102 to submit search queries that include more than two operands. Alternatively, the AND_Scanner takes only two operands but an arbitrary number of operands can be nested to generate the equivalent of a single AND_Scanner with a plurality of operands. For example, the search query A=1 AND B=0 AND C=bar could be represented as either AND (A=1, B=0, C=bar) or AND(A=1, AND(B=0, C=bar)). In situations where the AND_Scanner takes an arbitrary number of operands and the search query includes two or more operands, the plurality of operands includes (630) a plurality of subsequent (second, third, etc.) operands each associated with one or more filters and a subsequent set of one or more index portions.

Server 106 requests (632), from a subsequent (second, third, etc.) set of index portion(s), information indicative of a set of one or more index entries having a current last matching (first, second, etc.) identifier and matching the filter(s) of the subsequent (second, third, etc.) operand. Subsequently, Server 106 determines whether the subsequent (second, third, etc.) set of index portion(s) includes a set of one or more index entries having the current last matching (first, second, etc.) identifier and matching the filter(s) of the subsequent (second, third, etc.) operand. In other words, as described above, Server 106 uses the result from the immediately previous scanner as a starting point for identifying whether the next scanner has an index entry with the same identifier.

When the subsequent (second, third, etc.) set of index portion(s) does not include (634) a set of one or more index entries having the current last matching (first, second, etc.) identifier and matching the filter(s) of the subsequent (second, third, etc.) operand, Server 106 continues to perform the search operation without marking an entity associated with the last matching identifier as matching the search query. Optionally, Server also 106 marks (636) an entity associated with last matching identifier as not matching the search query. Additionally, when the subsequent set of index portion(s) does not include the current last matching identifier, Server 106 receives (638) a next last matching (second) identifier that is sequentially adjacent to the current last matching (first) identifier in the sort order in the subsequent set of index portion(s). In other words, as described in greater detail above, marking an entity as not matching a search query optionally includes simply skipping over an entity having the identifier or advancing in the current index portion(s) to a sequentially adjacent index entry with a next identifier.

After receiving the next last matching identifier, Server 106 identifies (640) a next "subsequent operand." When there are only two operands and the subsequent operand is the second operand the next "subsequent operand" is the first operand. In contrast, when there are more than two operands and the subsequent operand is the second operand, the next subsequent operand is a third operand. It should be understood that the operands each get a turn to serve as the next subsequent operand through this process, which scales to match the number of operands in the search query that are related by the same logical-relationship.

When the subsequent (second, third, etc.) set of index portion(s) includes (642) a set of one or more index entries having the current last matching (first, second, etc.) identifier and matching the filter(s) of the subsequent (second, third, etc.) operand, Server 106 retains (644) the current last matching (first) identifier. In other words, if the same identifier that corresponded to an index entry matching the filters of the last set of index components also corresponds to an index entry matching the filters of the current set of index components, then the index entry may correspond to an entity that matches all of the operands of the search query, because Server 106 has not yet found an operand that does not return the identifier as matching filters of the operand.

Subsequently, Server 106 determines whether all operands returned the current last matching identifier. When all operands have not (646) returned the current last matching identifier (e.g., there is at least one operand that has not provided information indicating whether or not there is an index entry matching the filters of the operand having the last matching identifier), Server 106 identifies (640) a next "subsequent operand" and repeats the process described above for the next "subsequent" operand. In this situation, the next "subsequent" operand is one of the operands that has not provided information indicating whether or not there is an index entry matching the filters of the operand that has the last matching identifier. The process above proceeds in round robin fashion for each operand until a same last matching identifier is returned by all of the operands. When all of the operands have (648) returned the current last matching identifier, Server 106 marks (650) an entity associated with current last matching identifier as matching the search query.

In some embodiments, after an entity associated with a current last matching identifier is received, if there is no limit on the number of matches to be retrieved or the number of matches to be retrieved has not yet been met, the process continues by identifying a next last matching identifier. In principle this new next last matching identifier can be retrieved from any index (e.g., because the process of determining if each operand will return the same identifier is beginning over again). However typically, the new next matching identifier is retrieved from the current subsequent set of index portions. Thus Server 106 receives (652) a next last matching identifier that is sequentially adjacent to the current last matching identifier in the sort order in the subsequent set of index portion(s) and identifies (640) a next "subsequent operand." It should be understood that this process can be repeated for each operand for the operator (e.g., the AND_Scanner) until a last "subsequent operand" is reached, in which case the first "subsequent operand" is the next "subsequent operand."

A specific example of the set of operations that are performed when the search query includes three operands related by the AND operator is described below. When the second set of index portion(s) does not include a set of one or more index entries having the first identifier and matching the filter(s) of the second operand, Server 106 receives, from the second set of index portions, a second identifier for a second set of one or more index entries having the second identifier and matching the filter(s) of the second operand. The second identifier is sequentially adjacent to the first identifier in the sort order in the second set of index portion(s). In other words, the second identifier has a predefined sequential relationship to the first identifier in accordance with the sort order in the second set of one or more index portions (e.g., the second identifier is sequentially adjacent to "virtual position" of the first identifier in the sort order in the second set of one or more index portion).

Thus, the plurality of operands includes a third operand associated with one or more filters in addition to the first operand and the second operand, and the plurality of index portions include a third set of one or more index portions. Server 106 determines whether the second set of index portion(s) includes a set of one or more index entries having the first identifier and matching the filter(s) of the second operand. When the second set of index portion(s) includes a set of one or more index entries having the first identifier and matching the filter(s) of the second operand, Server 106 requests, from the third set of index portion(s), information indicative of a set of one or more index entries having the first identifier and matching the filter(s) of the third operand. In contrast, when the second set of index portion(s) does not include a set of one or more index entries having the first identifier and matching the filter(s) of the second operand, Server 106 receives a second identifier for a second set of one or more index entries having the second identifier and matching the filter(s) of the second operand, where the second identifier is sequentially adjacent to the first identifier in the sort order in the second set of index portion(s). After receiving the second identifier, Server 106 requests, from the third set of index portion(s), information indicative of a set of one or more index entries having the second identifier and matching the filter(s) of the third operand.

Additionally, while the preceding examples have been described with reference to a situation where the AND_Scanner produced final results for transmission to Client 102, it should be understood that similar operations could be performed when the AND_Scanner produces intermediate results as an operand of a different scanner (e.g., an NOT_Scanner, an OR_Scanner or another AND_Scanner), with the difference that the intermediate results would be used as inputs for the different scanner rather being returned as search results to Client 102.

It should be understood that the particular order in which the operations in FIGS. 6A-6B have been described are merely exemplary and are not intended to indicate that the described order is the only order in which the operations could be performed. One of ordinary skill in the art would recognize various ways to reorder the operations described herein. Additionally, it should be noted that details of other processes described herein with respect to methods 500, 700, 800 and 900 (e.g., FIG. 5, 7, 8 or 9A-9B respectively) are also applicable in an analogous manner to method 600 described above with respect to FIGS. 6A-6B. For example, the operands, matching entities and indexes described above with reference to method 600 may have one or more of the characteristics of the various operands, matching entities and indexes described herein with reference to methods 500, 700, 800 and 900. For brevity, these details are not repeated here.

Identifying Matching Entities with a NOT_Scanner

Figure 7:
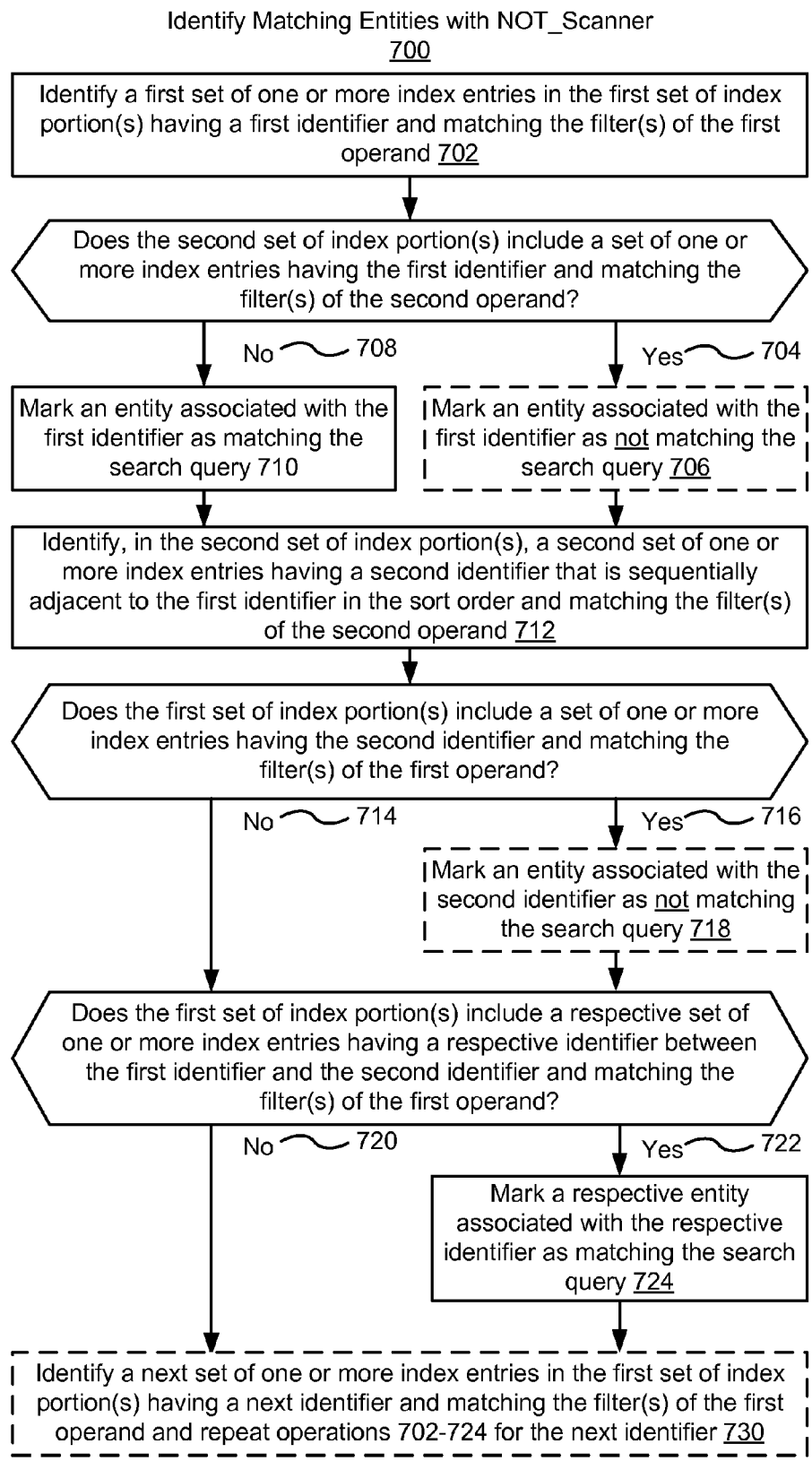
FIG. 7 includes a flow chart illustrating a method for identifying matching entities in index portions of one or more indexes when a logical relationship between operands of a search query is a Boolean NOT, in accordance with some embodiments.

FIG. 7 includes a flowchart representing a method 700 for identifying matching entities in one or more indexes when a logical relationship between operands of a search query is a Boolean NOT, according to certain embodiments. Method 700 is, optionally, governed by instructions that are stored in a non-transitory computer readable storage medium and that are executed by one or more processors of one or more servers (e.g., Server 106, FIG. 3). Each of the operations shown in FIG. 7 may correspond to instructions stored in a computer memory or computer readable storage medium (e.g., memory 306 of Server 106 in FIG. 3). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in method 700 may be combined and/or the order of some operations may be changed.

A NOT_Scanner can be represented as an operator that includes two operands, such as NOT(operand 1, operand 2). At a high level, NOT_Scanner implements a logical NOT operator by sequentially retrieving identifiers from a source scanner (e.g., the scanner for operand 1) and then requesting the same identifier from an inverted scanner (e.g., the scanner for operand 2). If the inverted scanner returns the same identifier, the identifier is discarded and the search process advances to a next identifier. Results are sequentially retrieved from the source scanner until a next identifier is found that does not match any identifier from the inverted scanner. This identifier is then returned by the NOT_Scanner as a matching result. The NOT_Scanner can efficiently perform the search operation using the next identifier from the source scanner as the minimum identifier in the inverted scanner. Additionally, if the last identifier returned by the inverted scanner is greater than an last identifier pulled from the source scanner Server 106 can determine implicitly that every result between the last identifier returned by the source scanner and the last identifier returned by the inverted scanner a valid result (as identifiers from both scanners are returned in order), further increasing the efficiency and/or speed of performing the search query.

Server 106 receives, from Client 102, a search query including filter criteria. The filter criteria specify a plurality of operands including a first operand associated with one or more filters, a second operand associated with one or more filters and a logical relationship (e.g., a Boolean NOT)

between the plurality of operands, as described in greater detail above with respect to FIG. 5. In response to the search query, Server 106 identifies a plurality of index portions including a first set of one or more index portions matching the filter(s) of the first operand and a second set of one or more index portions matching the filter(s) of the second operand. The index entries in the first set of index portion(s) and the second set of index portion(s) are sorted in a same sort order in accordance with identifiers for the index entries, as described in greater detail above with respect to FIGS. 4A-4C and 5. In some implementations, the sort order is determined in accordance with sort criteria specified in the search criteria (e.g., a user-specified custom sort order), the sort criteria including a set of one or more predefined sort parameters and corresponding sort directions. In some other implementations the sort order is determined in accordance with unique identifiers of index entries (e.g., a default sort order).

After receiving the search query, Server 106 identifies one or more matching entities that match the search query. In some implementations, identifiers are postfixes for the index entries, each of the postfixes including a unique identifier for an entity associated with the index entry and optionally a value for one or more property used as a sort criteria for the sort order. Typically, identifying the matching entities includes identifying (702) a first set of one or more index entries in the first set of index portion(s) having a first identifier and matching the filter(s) of the first operand.

In some implementations, after identifying the first set of one or more index entries in the first set of index portion(s) having the first identifier, Server 106 determines whether the second set of index portion(s) includes a set of one or more index entries having the first identifier and matching the filter(s) of the second operand. When the second set of index portion(s) includes (704) a set of one or more index entries having the first identifier and matching the filter(s) of the second operand, Server 106 continues to process the search query without marking an entity associated with the first identifier as matching the search query. Optionally, when the second set of index portion(s) includes a set of one or more index entries having the first index entries, Server 106 marks (706) an entity associated with the first identifier as not matching the search query. In contrast, when the second set of index portion(s) does not include (708) a set of one or more index entries having the first identifier and matching the filter(s) of the second operand, Server 106 marks (710) an entity associated with the first identifier as matching the search query.

After determining whether the second set of index portions includes a set of one or more index entries having the first identifier and matching the filters of the second operand, Server 106 identifies (712), in the second set of index portion(s), a second set of one or more index entries having a second identifier that is sequentially adjacent to the first identifier in the sort order and matching the filter(s) of the second operand. In some implementations, after identifying, in the second set of index portion(s), a second set of one or more index entries having the second identifier, Server 106 determines whether the first set of index portion(s) includes a set of one or more index entries having the second identifier matching the filter(s) of the first operand. When the first set of index portion(s) does not include (714) a set of one or more index entries having the second identifier and matching the filter(s) of the first operand, Server 106 continues to process the search query without marking an entity associated with the second identifier as matching the search query. Similarly, when the first set of index portion(s) includes (716) a set of one or more index entries having the second identifier and matching the filter(s) of the first operand, Server 106 also continues to process the search query without marking an entity associated with the second identifier as matching the search query. However, when the first set of index portions includes a set of one or more index entries having the second identifier and matching the filters of the first operand, Server 106 optionally marks (718) an entity associated with the first identifier as not matching the search query.

In some implementations, after identifying, in the second set of index portion(s), a second set of one or more index entries having the second identifier, Server 106 determines whether the first set of index portion(s) includes a respective set of one or more index entries having a respective identifier between the first identifier and the second identifier and matching the filter(s) of the first operand. When the first set of index portion(s) does not (720) include a respective set of one or more index entries having a respective identifier between the first identifier and the second identifier and matching the filter(s) of the first operand, Server 106 continues to process the search query without marking a respective entity associated with the respective identifier as matching the search query. In contrast, when the first set of index portion(s) includes a respective set of one or more index entries having a respective identifier between the first identifier and the second identifier and matching the filter(s) of the first operand, Server 106 marks (724) a respective entity associated with the respective identifier as matching the search query. In other words, because the second set of index portions do not include any index entries matching filters of the second operand with identifiers between the first identifier and the second identifier, any sets of matching index entries that match the filters of the first operand with identifiers between the first identifier and the second identifier will match the search query "first operand" NOT "second operand."

After performing the operations above and optionally identifying one or more matching entities, in some implementations Server 106 repeats the process starting with identifying (730) a next set of one or more index entries in the first set of index portion(s) having a next identifier and matching the filter(s) of the first operand and then repeating operations 702-724 for the next identifier. In some situations, after identifying the one or more matching entities, when all matching entities have been identified or a predefined limit on the number of matching entities to identify has been reached, Server 106 transmits representations of one or more of the matching entities to Client 102, as described in greater detail above with reference to FIG. 5.

Additionally, while the preceding examples have been described with reference to a situation where the NOT_Scanner produced final results for transmission to Client 102, it should be understood that similar operations could be performed when the NOT_Scanner produces intermediate results as an operand of a different scanner (e.g., an AND_Scanner, an OR_Scanner or another NOT_Scanner), with the difference that the intermediate results would be used as inputs for the different scanner rather being returned as search results to Client 102.

It should be understood that the particular order in which the operations in FIG. 7 have been described are merely exemplary and are not intended to indicate that the described order is the only order in which the operations could be performed. One of ordinary skill in the art would recognize various ways to reorder the operations described herein. Additionally, it should be noted that details of other processes described herein with respect to methods 500, 600, 800 and 900 (e.g., FIG. 5, 6A-6B, 8 or 9A-9B respectively) are also applicable in an analogous manner to method 700 described above with respect to FIG. 7. For example, the operands, matching entities and indexes described above with reference to method 700 may have one or more of the characteristics of the various operands, matching entities and indexes described herein with reference to methods 500, 600, 800 and 900. For brevity, these details are not repeated here.

Identifying Matching Entities with an OR_Scanner

Figure 8:
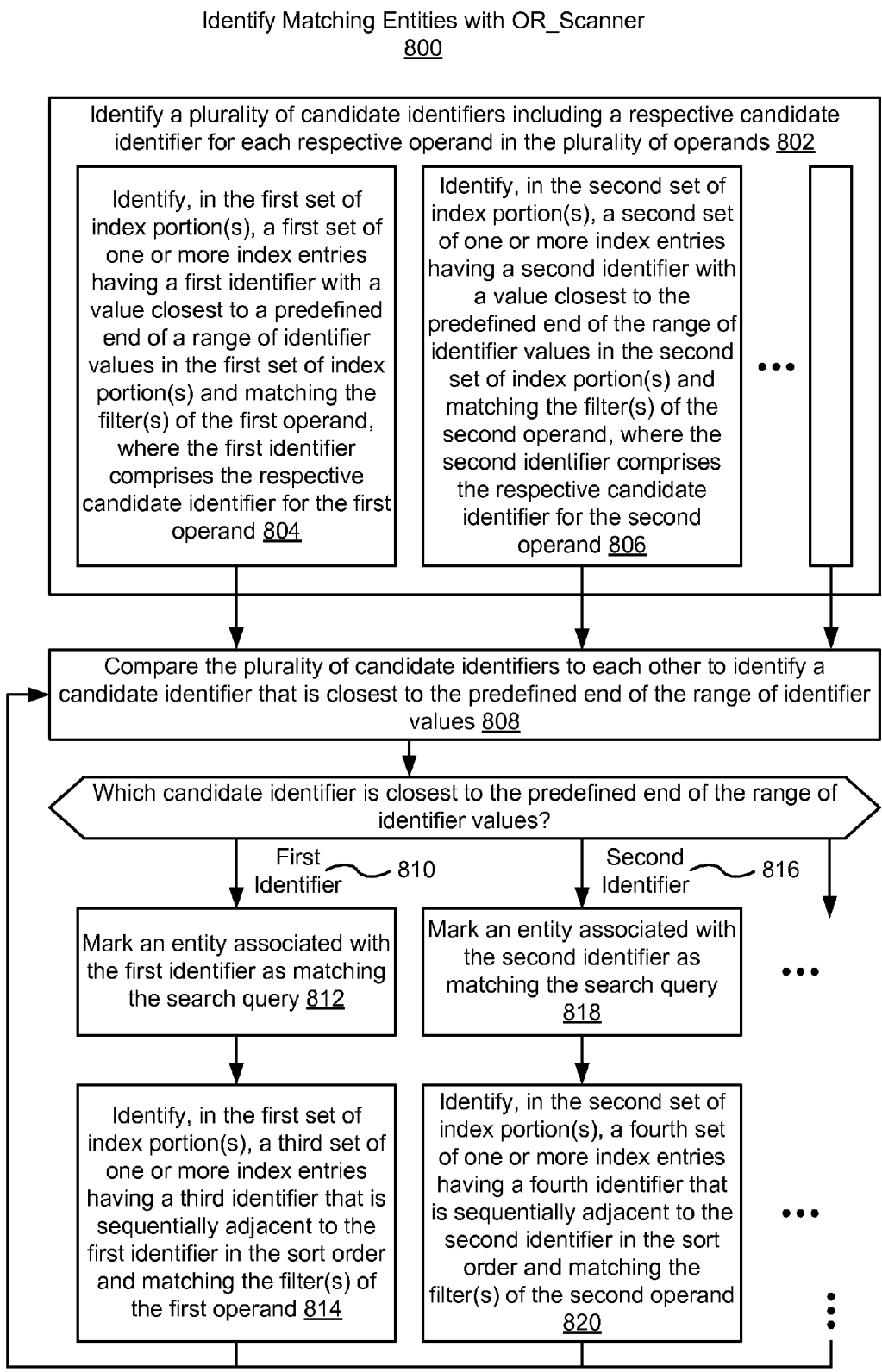
FIG. 8 includes a flow chart illustrating a method for identifying matching entities in index portions of one or more indexes when a logical relationship between operands of a search query is a Boolean OR, in accordance with some embodiments.

FIG. 8 includes a flowchart representing a method 800 for identifying matching entities in one or more indexes when a logical relationship between operands of a search query is a Boolean OR, according to certain embodiments. Method 800 is, optionally, governed by instructions that are stored in a non-transitory computer readable storage medium and that are executed by one or more processors of one or more servers (e.g., Server 106, FIG. 3). Each of the operations shown in FIG. 8 may correspond to instructions stored in a computer memory or computer readable storage medium (e.g., memory 306 of Server 106 in FIG. 3). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in method 800 may be combined and/or the order of some operations may be changed.

An OR_Scanner can be represented as an operator that includes a plurality of operands, such as OR(operand 1, operand 2, operand 3, . . . ). At a high level, the OR_Scanner implements a logical OR operator which implies that every result from a source scanner (e.g., filter scanners or logical-relationship scanners) associated with the operands should be returned as a matching result. However, special care should be taken to ensure that results are returned in a predefined sort order. This can be implemented through the use of a priority queue that stores the next result from each scanner. When a result is pulled of the top of this priority queue, the next result from the scanner that provided the result pulled off of the priority queue is added back into the priority queue before another result is returned by the OR_Scanner. An OR_Scanner using this implementation is particularly advantageous when combined with other logical-relationship scanners (e.g., when one or more of the operands is, itself a logical-relationship scanner such as an AND_Scanner or a NOT_Scanner). In these circumstances, the Server 106 will be able to efficiently skip large sections of results for all operands of the OR_Scanner that do not match any one of the logical-relationship scanners. In other words, the OR_Scanner enables the minimum value used in the OR_Scanner to be shared by the other logical-relationship scanners. Thus the performance of the OR_Scanner is usually much more efficient than simply performing multiple search queries and combining the results.

Server 106 receives, from Client 102, a search query including filter criteria. The filter criteria specify a plurality of operands including a first operand associated with one or more filters, a second operand associated with one or more filters and a logical relationship (e.g., a Boolean OR) between the plurality of operands, as described in greater detail above with respect to FIG. 5. In response to the search query, Server 106 identifies a plurality of index portions including a first set of one or more index portions matching the filter(s) of the first operand and a second set of one or more index portions matching the filter(s) of the second operand. The index entries in the first set of index portion(s) and the second set of index portion(s) are sorted in a same sort order in accordance with identifiers for the index entries, as described in greater detail above with respect to FIGS. 4A-4C and 5. In some implementations, the sort order is determined in accordance with sort criteria specified in the search criteria (e.g., a user-specified custom sort order), the sort criteria including a set of one or more predefined sort parameters and corresponding sort directions. In some other implementations the sort order is determined in accordance with unique identifiers of index entries (e.g., a default sort order).

After receiving the search query, Server 106 identifies one or more matching entities that match the search query. In some implementations, identifiers are postfixes for the index entries, each of the postfixes including a unique identifier for an entity associated with the index entry and optionally a value for one or more property used as a sort criteria for the sort order. Identifying the matching entities includes identifying (802) a plurality of candidate identifiers including a respective candidate identifier for each respective operand in the plurality of operands. Server 106 identifies, (804) in the first set of index portion(s), a first set of one or more index entries having a first identifier with a value closest to a predefined end of a range of identifier values in the first set of index portion(s) and matching the filter(s) of the first operand, where the first identifier comprises the respective candidate identifier for the first operand. Typically, the predefined end corresponds to the lowest possible or highest possible identifier of an index entry that matches the respective filter. In other words, the predefined end of the range of identifier values is the end from which the search proceeds (which could also be termed a "beginning" of the range of identifier values). For example, if the search proceeds in ascending order through the identifiers in a respective index or index portion, the predefined end is a minimum value (e.g., 0, or the value of the identifier for the first matching index entry in the respective index or index portion). In contrast, if the search proceeds in descending order through the identifiers in a respective index or index portion, the predefined end is a maximum value for the identifiers (e.g., 256 if the identifiers are 8-bit binary numbers, or the value of the identifier for the first matching index entry in the respective index or index portion).

Similarly, Server 106 also identifies, (806) in the second set of index portion(s), a second set of one or more index entries having a second identifier with a value closest to the predefined end of the range of identifier values in the second set of index portion(s) and matching the filter(s) of the second operand, where the second identifier comprises the respective candidate identifier for the second operand. More generally, it should be noted that this process of identifying the plurality of candidate identifiers can include identifying candidate identifiers for any number of operands. Usually, a candidate identifier will be generated for each operand. However, in some circumstances there may not be any index entries that match the filter(s) of a respective operand and thus there would not be any candidate identifier from the respective operand in the plurality of candidate identifiers. However, even in these situations, there would still be candidate identifiers for other operands.

After identifying the candidate identifiers, Server 106 compares (808) the plurality of candidate identifiers to each other to identify a candidate identifier that is closest to the predefined end of the range of identifier values (e.g., the highest or lowest candidate identifier). When the first identifier (810) is the candidate identifier closest to the predefined end of the range of identifier values, Server 106 marks (812) an entity associated with the first identifier as matching the search query. Additionally, Server 106 also identifies (814) in the first set of index portion(s), a third set of one or more index entries having a third identifier that is sequentially adjacent to the first identifier in the sort order and matching the filter(s) of the first operand. In some implementations, the first identifier is removed from the plurality of candidate identifiers and the third identifier is added to the plurality of candidate identifiers.

Similarly, when the second identifier (816) is the candidate identifier closest to the predefined end of the range of identifier values, Server 106 marks (818) an entity associated with the second identifier as matching the search query and identifies (820), in the second set of index portion(s), a fourth set of one or more index entries having a fourth identifier that is sequentially adjacent to the second identifier in the sort order and matching the filter(s) of the second operand. In some implementations, the second identifier is removed from the plurality of candidate identifiers and the fourth identifier is added to the plurality of candidate identifiers. In other words, more generally, when an identifier is selected as a matching identifier it is removed from the plurality of candidate identifiers and replaced with a next identifier, if any, from the set of one or more indexes from which the matching identifier originated. It should be understood that this process can be repeated to produce any number of desired results (up to the number of matching results in all of the sets of index portions), with the results being produced one at a time and the plurality of candidate identifiers being replaced as identifiers for matching entities and removed from the plurality of candidate identifiers.

Additionally, while the preceding example has been given with respect to a simple case where there are only two operands, as described above, the OR_Scanner can operate on any number of operands. The additional operands would simply each provide a candidate identifier for the plurality of candidate identifiers, which if selected would cause analogous operations to be performed as described above with respect to the first operand and the second operand. As a specific example, when the search query includes a third operand associated with one of more filters, Server 106 identifies a third set of one or more index portions matching the filter(s) of the third operand.

After identifying the third set of one or more index portions, Server 106 identifies, in the third set of index portion(s), a fifth set of one or more index entries having a fifth identifier with a value closest to the predefined end of the range of identifier values in the third set of index portion(s) and matching the filter(s) of the third operand, where the fifth identifier comprises the respective candidate identifier for the third operand. As described above, Server 106 compares the plurality of candidate identifiers to each other to identify a candidate identifier that is closest to the predefined end of the range of identifier values. When the fifth identifier is the candidate identifier closest to the predefined end of the range of identifier values, Server 106 marks an entity associated with the fifth identifier as matching the search query and also identifies, in the third set of index portion(s), a sixth set of one or more index entries having a sixth identifier that is sequentially adjacent to the fifth identifier in the sort order and matching the filter(s) of the third operand. In some implementations, the first identifier is removed from the plurality of candidate identifiers and the third identifier is added to the plurality of candidate identifiers. It should be understood that there could be an arbitrary number of operands, and an analogous set of operations would be performed for each additional operand.

In some situations, after identifying one or more matching entities, when all matching entities have been identified or a predefined limit on the number of matching entities to identify has been reached, Server 106 transmits representations of one or more of the matching entities to Client 102, as described in greater detail above with reference to FIG. 5.

Additionally, while the preceding examples have been described with reference to a situation where the OR_Scanner produced final results for transmission to Client 102, it should be understood that similar operations could be performed when the OR_Scanner produces intermediate results as an operand of a different scanner (e.g., an AND_Scanner, a NOT_Scanner or another OR_Scanner), with the difference that the intermediate results would be used as inputs for the different scanner rather being returned as search results to Client 102.

It should be understood that the particular order in which the operations in FIG. 8 have been described are merely exemplary and are not intended to indicate that the described order is the only order in which the operations could be performed. One of ordinary skill in the art would recognize various ways to reorder the operations described herein. Additionally, it should be noted that details of other processes described herein with respect to methods 500, 600, 700 and 900 (e.g., FIG. 5, 6A-6B, 7 or 9A-9B respectively) are also applicable in an analogous manner to method 800 described above with respect to FIG. 8. For example, the operands, matching entities and indexes described above with reference to method 800 may have one or more of the characteristics of the various operands, matching entities and indexes described herein with reference to methods 500, 600, 700 and 900. For brevity, these details are not repeated here.

Query Cursors

Figure 9A:
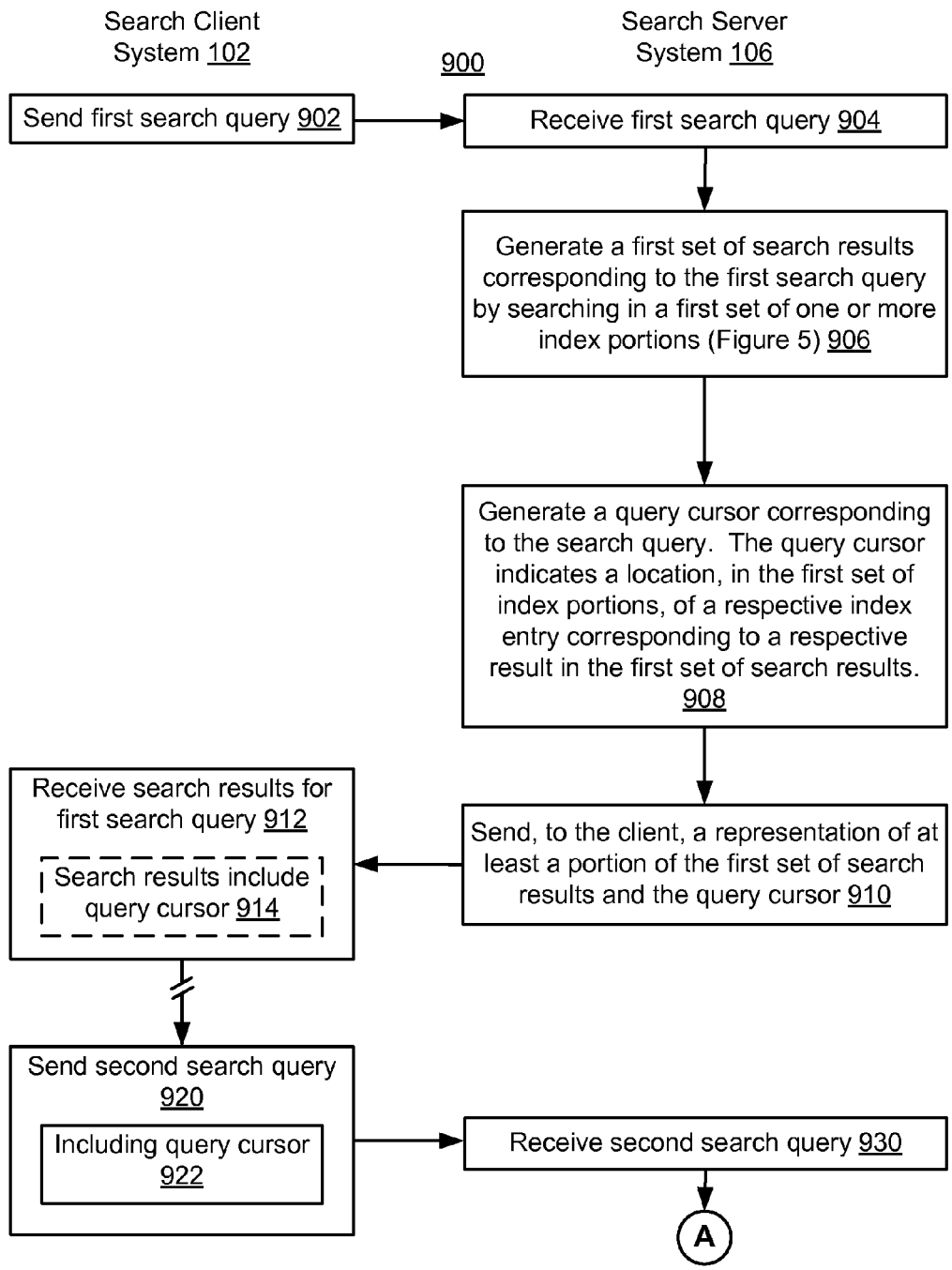
FIGS. 9A-9B include a flow chart illustrating a method for coordinating successive search queries using a query cursor, in accordance with some embodiments.
Figure 9B:
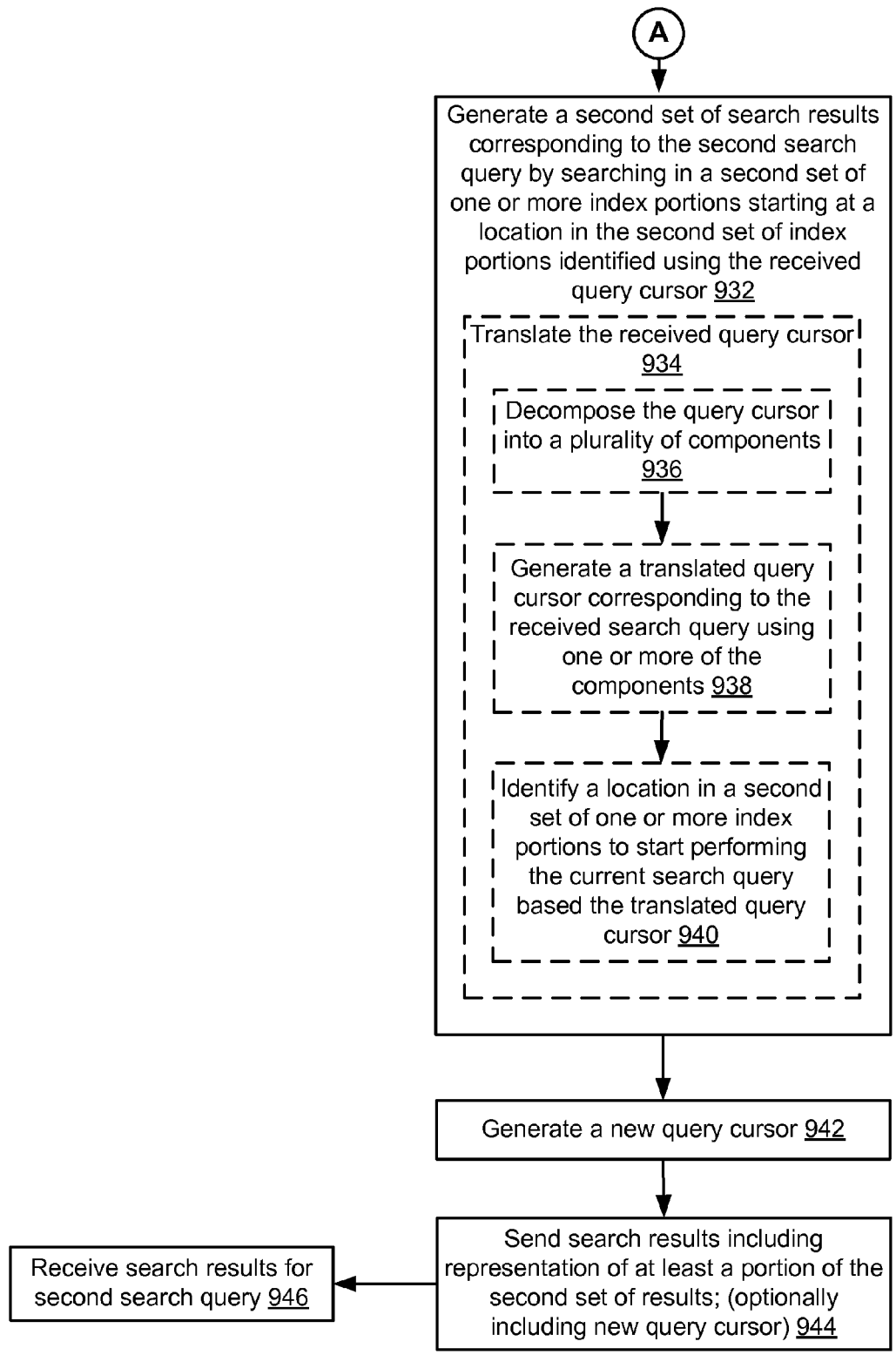

FIGS. 9A-9B include a flowchart representing a method 900 for coordinating successive search queries using a query cursor, according to certain embodiments. Method 900 is, optionally, governed by instructions that are stored in a non-transitory computer readable storage medium and that are executed by one or more processors of one or more servers (e.g., Server 106, FIG. 3). Each of the operations shown in FIGS. 9A-9B may correspond to instructions stored in a computer memory or computer readable storage medium (e.g., memory 306 of Server 106 in FIG. 3). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in method 900 may be combined and/or the order of some operations may be changed.

Query cursors allow Server 106 to perform a search query and retrieve a batch of results, then fetch additional results for the same search query in a subsequent web request without the overhead of a query offset. After Server 106 fetches some results for a search query, it can generate an encoded string that represents the location in the result set after the last result fetched (the "query cursor"). Server 106 can use the query cursor to fetch additional results starting from that stopping point at a later time. In some implementations a query cursor is an opaque base64-encoded string that represents the next starting position of a search query after a prior search query. Server 106 can provide a query cursor to other computers (e.g., Client 102 or other servers) to be embedded in web pages as HTTP GET or POST parameters. In some implementations, Server 106 stores the query cursor for later use so that when another Client 102 requests performance of the same search query and includes the query cursor with the search query, Server 106 is able to start returning results from the location represented by the query cursor. An exemplary method for using query cursors for a broad range of queries including queries that are different from the queries from which the query cursors were generated is described below.

Client 102 sends (902) a first search query, and Server 106 receives (904) the first search query. In response to the first search query, Server 106 generates (906) a first set of search results corresponding to the first search query by searching in a first set of one or more index portions (e.g., as described in greater detail above with reference to FIG. 5). Server 106 also generates (908) a query cursor corresponding to the search query, where the query cursor indicates a location, in the first set of index portions, of a respective index entry corresponding to a respective result in the first set of search results. After generating the query cursor and the search results, Server 106 sends (910), to Client 102, a representation of at least a portion of the first set of search results and the query cursor. Client 102 receives (912) the search results for the search query, where the search results include (914) the query cursor generated by Server 106 in response to the first search query.

At some later point in time, Client 102 sends (920) a second search query to Server 106, where the second search query includes (922) a query cursor (e.g., the query cursor generated by Server 106 in response to the first search query). Alternatively, or in addition, Client 102 or Server 106 generates a query cursor based on information about the original search or even a particular entity identified by a user of Client 102. Server 106 receives (930), from Client 102, a second search query including the query cursor.

In some implementations, the query cursor is still valid even when one or more of the following conditions are true: the second search query and/or the indexes/index portions that will be used to generate a response to the second search query are different from the first search query and/or the indexes/index portions that were used to generate a response to the first search query; the search terms in the first search query are different from the search terms in the second search query; the first search query specifies a sort order that is different from a sort order of the second search query; the first search query specifies a first set of one or more predefined sort parameters for sorting that is different from a second set of one or more predefined sort parameters for sorting that is specified by the second search query; the first search query requests results in a predefined range that is different from a predefined range of results requested by the second search query; and/or the first search query specifies a logical relationship between search terms that is different from a logical relationship between search terms in the second search query.

In some implementations, the query cursor is valid for the second search query only if the second search query includes only search terms from the first search query. As described in greater detail above, in some implementations, a particular index can be used for multiple queries, so long as the properties by which the index entries are sorted are the same for both queries. Thus, if the first search query and the second search query use the same index, then a location specified by the query cursor in the index for the first search query will be valid for the index used by the same search query. In other words, in some implementations, the search terms are filters (e.g., parameter=value) and the second search query must include the same filters or a subset of the filters used by the first search query, however the query cursor will be valid even when some search terms are omitted, a specified range of results are changed, a sort order is changed and/or a logical relationship between the search terms is changed. Additionally, in some situations, the current search query has opposite sort order from the prior search query.

One situation where a current search order is frequently the opposite of a prior search order is where a user is paging forward or backward through sets of results for a single search query. For example, when viewing a set of search results (e.g., emails in a web email account matching a user submitted search query), the user may initially request to view a first twenty matching results, then request page forward to a second twenty matching results and a third twenty matching results. However, if these searches are performed using the methods described in greater detail above, which return search results sequentially in accordance with a sort order of the index portions used to execute the search query, a search query can only proceed in the direction of the sort order from the query cursor. Thus, in these implementations, a query cursor must be located at or prior to the index entry for the next search result to be returned. Consequently, in these implementations it is difficult to page backwards through results if query cursors correspond to a last result of the previous set of results, because the same indexes cannot be used to run the search query in reverse.

However, given that paging backwards in search results is a frequently requested operation, it would be advantageous to enable paging backwards through search results. One way to enable paging backwards through search results is simply to record each query cursor corresponding to the beginning of each page, so that when the user returns to a previous page, the stored query cursor can be used to generate search results for that page. However, this solution is inefficient and can require storing a very large number of old query cursors against the possibility (however remote) that the user may at some point in the future request to display a previously displayed set of search results.

In contrast, a more efficient solution is to simply reverse the search order (e.g., by executing a search with the same filters on a set of one or more index portions that have an opposite search order) and use a query cursor to identify a starting point for the search. However, as described above, in implementations where the search results are sequentially identified based on a sort order of the index portions in which they are identified, a search query cannot be performed over the same set of indexes when the direction is reversed. Instead, a new set of index portions that are sorted in the desired sort order (which in this case is the opposite of the previous sort order) is identified. However, in order to page backwards it is important to start from the location expected by the user (e.g., a location corresponding to a result after the first result in the current result set) so as to provide expected results. This location can then be used as a starting point for the search by searching forwards from the starting point in the opposite search order, which is essentially searching "backwards." Thus, it would be desirable to use some information from the previously retrieved set of search results to determine where to start the subsequent search query.

Thus, in some implementations, components that were used to generate a prior query cursor are used to identify a location within the index portions used for the current search query (e.g., the index portions with the reversed search order). This enables Server 106 to scan forward from the query cursor in the index portions used for the current search query so as to generate a previous set of twenty results. This approach to providing the ability page backward through results is more efficient than other approaches, because this approach enables paging backward through an arbitrary number of prior results sets while only requiring that at most two query cursors be stored (e.g., a query cursor indicating a beginning of the search results for paging backward and a query cursor indicating an end of the search results for paging forward). Optionally other query cursors could be stored to identify other predefined locations within the search results (e.g., "advance five pages" or "go back five pages"). Additionally, while the preceding example has been discussed with reference to a particular instance where a query cursor from a prior query is used to identify a location in one or more index portions to start a current query, it should be understood that many other situations exist to which the general principles described below could be applied to improve efficiency, accuracy and/or speed of performing search queries. Moreover, the ability to translate query cursors between index portions of different indexes is particularly advantageous in systems where different search queries are performed using different indexes, as described above, because in such systems, indexes will frequently change between search queries.

In response to the second search query (e.g., the search query that includes the query cursor), Server 106 generates (932) a second set of search results corresponding to the second search query by searching in a second set of one or more index portions starting at a location in the second set of index portions identified using the query cursor. In some situations, the query cursor generated in response to the first search query is the same as the query cursor used to generate the second set of search results. For example, when the first search query and the second search query have results sorted in the same sort order in accordance with postfixes of the index entries and the query cursor is based on the postfix of a last index entry returned for the first search query, the query cursor can also be used, without translation to identify a location in the index portions for the second search query. In contrast, in other situations, the query cursor generated in response to the first search query is the different from the query cursor used to generate the second set of search results. For example, when the first search query and the second search query have results sorted in the different sort orders in accordance with postfixes of the index entries and the received query cursor must be translated so as to properly identify a location within the index portions for the second search query.

In some implementations, the "location" specified by a query cursor is an indication that the starting location in one or more index portions is a postfix of a last matching index entry for a previous search query. In some other implementations the "location" specified by a query cursor is an indication that the starting location in one or more index portions is sequentially adjacent to a postfix of a last matching index entry for a previous search query. As one example, the "location" specifies that the search query is to start with an index entry in the index portion that has a postfix that is adjacent to and greater than the postfix of the last matching index entry (e.g., a sequentially "next" index entry in the index portions). It should be understood that, the location of a query cursor is not a relative position in the list (e.g., it is not an offset), rather the query cursor includes a value (e.g., a postfix) that enables Server 106 jump to a particular location in an index or index portion and begin a scan from that location (e.g., using a filter scanner or a logical-relationship scanner, as described in greater detail above). When the scan is a scan performed by a logical-relationship scanner (e.g., AND(A=1, B=0)), the query cursor identifies a location in each of the index portions corresponding to each of the operands of the logical-relationship scanner, to coordinate the starting location for the search query with all of the index portions used to perform the search query.

It should be understood that, if the contents of an index change between uses of a particular query cursor in a way that would affect results of the search query, only changes that occur in index portions at locations after the location corresponding to the position of the query cursor affect the search results. For example, if a new index entry appears "behind" the query cursor (e.g., at a position in the index portion that the query cursor indicates has already been searched), the new index entry will not be returned in response to the same search query that includes the query cursor. Similarly, if an index entry that was previously identified as a result for the search query has been modified so that it is no longer a result for the search query, but appeared "behind" the query cursor, the results that are generated in response to a subsequent execution of the search query using the query cursor (e.g., based on index entries "in front of" the query cursor) do not change. An additional advantage of the query cursor described herein is that even if the index entry corresponding to the last result in the previous set of results is removed from the index portion in between search query executions, the query cursor provides information in a way that still enables Server 106 to locate a next result. Thus updates to an index do not invalidate the query cursor.

In some implementations, the query cursor identifies a location in a plurality of different index portions. (e.g., a location in each index portion used to respond to the search query). In some implementations, the query cursor is sort order dependent. In other words, the query cursor is associated with a location of a particular index entry in a particular sort order, and thus changing the sort order will render the query cursor invalid. However, even when the received query cursor is invalid, in some implementations it is possible to extract useful information from the received query cursor either by generating a new query cursor or using components from the query cursor to identify a location in index portions for the second search query that corresponds to a location identified by the query cursor.

In particular, in some implementations, generating the second set of search results includes translating (934) the query cursor (e.g., the query cursor generated by Server 106 in response to the first search query) to generate a new query cursor. When translating the query cursor, Server 106 decomposes (936) the query cursor into a plurality of components. These components optionally include a component that corresponds to a key (unique identifier) for an entity matching the prior search query. The components also include alternatively or in addition, one or more components that correspond to respective values of predefined filter and/or sort parameter associated with the entity (e.g., date, relevance, etc.) in the prior search query. In some implementations, the query cursor is the postfix of an index entry identified as matching a previous search query or a value based on the postfix (e.g., a hash of a postfix) for such an index entry. As discussed above a postfix for an index entry includes a key, any values for properties used to sort the index portion, and optionally any values for properties used to execute inequality/range filters when performing a search query. Thus, decomposing the query cursor optionally includes identifying individual values for properties that were a part of the postfix for an index entry that was a result for the prior search query.

After decomposing the query cursor received in response to the first search query, Server 106 generates (938) a translated query cursor using one or more of the components. In one implementation, the components of the query cursor are the key and any values used to sort or perform inequality/range filters (e.g., the key and values from the postfix). Thus, if a search query is performed with all or a subset of these sort values, a query cursor in the index portions for responding to the second search query can be generated using the key and whatever set or subset of the values would be expected to appear in a postfix in index entries for the second search query. In some implementations, the plurality of components of the query cursor corresponding to the prior search query have a first order, and Server 106 generates the translated query cursor by rearranging one or more of the components into a second order different from the first order. As one example, the first order of the components of the query cursor is an order in which properties are used to sort the index portion that was used for executing the prior search query. In the embodiments described above with reference to FIGS. 4A-4C, the order would be the order of the columns. Continuing this example, the second order would be an order in which properties are used to sort the index portion(s) used for executing the current search query. Thus, the components of a query cursor can be rearranged so that they provide information enabling Server 106 to construct a translated query cursor that identifies a location within index portions that will be used to execute the current search query. For example, a query cursor that was generated from a postfix including the values A=1, C=bar, key=4 could be translated to a query cursor corresponding to a postfix where: C=bar, A=1, key=4, a postfix where A=1, key=4, a postfix where C=bar, key=4 or a postfix where key=4. Referring specifically to the exemplary indexes in FIG. 4C, a query cursor with a postfix where C=bar, key=4 would identify a location in Index 142-AC (e.g., the first row of the index portion where A=1 in Index 142-AC) and a location in Index 142-BC (e.g., the third row of the index portion where B=0 in Index 142-BC) and can be translated to identify a location in Index CA (e.g., the third row of the index portion for C=bar in Index 142-CA).

After generating the translated query cursor, Server 106 identifies (940) a location in the index portions in the second set of index portions to start performing the second search query based on a location of the translated query cursor in the second set of index portions. In some situations the first set of index portions and the second set of index portions include one or more common index portions. In other situations, the first set of index portions will be distinct from the second set of index portions. In other words, the query cursor from a first search query executed over a particular index portion can be used to find a corresponding location in a different index portion. In some implementations, identifying the location in the second set of one or more index portions to start performing the current search query based on the translated query cursor includes identifying the location in the second set of one or more index portions based on one or more of the predefined sort criteria of the prior search query. For example, if the prior search query was "A=1, B=0, Sort by Date, Sort by Relevance" and the current search query is "A=1, B=0, Sort by Relevance," the translated query cursor would use a key and a value of relevance for an index entry in the index portion used to execute the first search query to generate the translated query cursor.

In some implementations, after Server 106 has generated the second set of search results, Server 106 generates (942) a new query cursor that indicates a stopping point of a search performed using the second search query. Server 106 sends (944), to Client 102 search results including representation of at least a portion of the second set of results. Client 106 receives (946) the search results for second search query. In some implementations, the second set of search results include the new query cursor. This new query cursor can be used in the same way as the query cursor generated based on the first search query (e.g., used to identify a starting location and/or translated to generate a translated query cursor that is used to identify a starting location in a different index).

Additionally, it should be noted that a query cursor can be generated based on an arbitrary or user selected search result. For example, a user requests that a next search query start with a particular search result from the results sent to Client 102 in response to the first search query. Server 106 responds to the request by using information known about the particular search result to identify a postfix that corresponded to the particular search result generating a query cursor based on that user selected search result. This custom query cursor generated based on the particular search result selected by the user can be used in the same way as any of the other query cursors described herein.

An interesting application of query cursors is to monitor entities for unseen updates to entities. For example, if Server 106 sets a timestamp property with the current date and time every time an entity is updated, Client 106 can use a search query with sort criteria specifying that the results of the search query be sorted by the timestamp property, ascending. In this example, Server 106 can store a query cursor that indicates a most recently updated result and therefore indicated when index entries are moved to the end of the index portion. If an entity's timestamp is updated, the search query with the stored query cursor will return the updated entity and Server 106 updates the query cursor to correspond to the most recently updated entity and timestamp. In contrast, if no entities have been updated since the last time the search query was performed, the search query with the stored query cursor will not return any results, and the query cursor is not updated.

Additionally, while the preceding embodiments have been described with reference to using a single query cursor to identify a stopping point of a last search query and thus to identify a starting point of a subsequent search query, the use of multiple query cursors is contemplated. For example, when retrieving search query results, Server 106 can use both a start query cursor and an end query cursor to return a continuous group of results from the a set of one or more index portions (e.g., return all results matching the search query with dates between Apr. 2, 2011 and Apr. 21, 2011). It should be understood that when using a start query cursor and end query cursor to retrieve the results, it is not guaranteed that the size of the results will be the same as when the start query cursor and the end query cursor were generated. In particular, index entries may have been added to or deleted from the index portions between the time the query cursors were generated and when they are used to perform the search query. However, such an approach advantageously enables a Client 102 to specify a persistent predefined range of values for a sort parameter and efficiently return all matches to a search query that fall within the range of values for the sort parameter.

It should be understood that the particular order in which the operations in FIGS. 9A-9B have been described are merely exemplary and are not intended to indicate that the described order is the only order in which the operations could be performed. One of ordinary skill in the art would recognize various ways to reorder the operations described herein. Additionally, it should be noted that details of other processes described herein with respect to methods 500, 600, 700 and 800 (e.g., FIG. 5, 6A-6B, 7 or 8 respectively) are also applicable in an analogous manner to method 900 described above with respect to FIGS. 9A-9B. For example, the search queries, query cursors and search results described above with reference to method 900 may have one or more of the characteristics of the various search queries, query cursors and search results described herein with reference to methods 500, 600, 700 and 800. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
receiving, from a client, a search query including filter criteria, wherein the filter criteria specify a plurality of operands including
   a first operand associated with one or more filters and a second operand associated with one or more filters, and
   a logical relationship between the plurality of operands, wherein the logical relationship between the plurality of operands is a Boolean NOT; and
in response to the search query:
   identifying a plurality of index portions including
      a first set of one or more index portions matching the filter(s) of the first operand and
      a second set of one or more index portions matching the filter(s) of the second operand, wherein
      the plurality of index portions are identified in accordance with
         the plurality of operands and
         a criterion that index entries in the first set of index portion(s) and the second set of index portion(s) are sorted in a same sort order in accordance with identifiers for the index entries, and
      each of the plurality of index portions has a distinct combination of operands and sort order;
   identifying one or more matching entities that match the search query, wherein the identifying includes:
      (A) identifying a first set of one or more index entries in the first set of index portion(s) having a first identifier and matching the filter(s) of the first operand;
      (B) identifying, in the second set of index portion(s), a second set of one or more index entries in accordance with a second identifier, wherein
         the second identifier is closest to the first identifier in the sort order for index entries in the second set of index portion(s) that match the filter(s) of the second operand;
      (C) determining whether the first set of index portion(s) includes a respective set of one or more index entries that (i) matches the filter(s) of the first operand, and (ii) has respective identifiers between the first identifier and the second identifier; and
      (D) in accordance with a determination that the first set of index portion(s) includes a respective set of one or more index entries (i) having a respective identifier between the first identifier and the second identifier and (ii) matching the filter(s) of the first operand,
         marking a respective entity associated with the respective identifier as matching the search query; and
providing representations of one or more of the matching entities to the client.

2. The method of claim 1, further comprising, after identifying the first set of one or more index entries in the first set of index portion(s) having the first identifier:
   determining whether the second set of index portion(s) includes a set of one or more index entries having the first identifier and matching the filter(s) of the second operand, and:
   in accordance with a determination that the second set of index portion(s) includes a set of one or more index entries having the first identifier and matching the filter(s) of the second operand,
      continuing to process the search query without marking an entity associated with the first identifier as matching the search query; and
   in accordance with a determination that the second set of index portion(s) does not include a set of one or more index entries having the first identifier and matching the filter(s) of the second operand,
      marking an entity associated with the first identifier as matching the search query.

3. The method of claim 1, further comprising, after identifying, in the second set of index portion(s), a second set of one or more index entries having the second identifier:
   determining whether the first set of index portion(s) includes a set of one or more index entries having the second identifier and matching the filter(s) of the first operand; and
   in accordance with a determination that the first set of index portion(s) includes a set of one or more index entries having the second identifier and matching the filter(s) of the first operand,
      continuing to process the search query without marking an entity associated with the second identifier as matching the search query.

4. The method of claim 1, wherein the sort order is determined in accordance with sort criteria specified in the search criteria, the sort criteria including a set of one or more predefined sort parameters and corresponding sort directions.

5. The method of claim 1, the search query specifies that no more than a predefined number of identifiers are to be retrieved, and the retrieving includes retrieving no more than the predefined number of identifiers.

6. The method of claim 1, wherein the filters used for the search query include filters selected from one of the following sets: a plurality of equality filters; one or more equality filters and a single inequality filter; or one or more equality filters and a single range filter.

7. The method of claim 1, wherein:
   the plurality of index portions include a first index portion identified in a first index and a second index portion identified in a second index;
   the first index is different from the second index;
   the first index has a different overall sort order than the second index; and
   the first index portion and the second index portion are sorted in the predefined sort order.

8. The method of claim 1, wherein:
   each filter specifies a property having a plurality of different possible values and a particular value of the property that matches the filter;

identifying a respective index portion for a respective operand that has a respective filter and one or more predefined sort parameters includes:
  identifying an index that is sorted in accordance with the different possible values of a respective property of the respective filter and the one or more predefined sort parameters; and
  selecting, as the respective index portion, a portion of the identified index that includes all of the index entries having the particular value for the respective property that matches the filter.

9. The method of claim 1, wherein:
the search query includes a plurality of sort criteria specifying a set of one or more predefined sort parameters and corresponding sort directions for sorting index entries in the sort order;
the sort order is one of a plurality of sort orders;
the plurality of index portions are selected from a plurality of indexes; and
the plurality of indexes include at least one distinct index for each of the plurality of sort orders.

10. The method of claim 9, wherein the plurality of index portions are selected from a set of index portions including:
an ascending index portion for the set of one or more predefined sort parameters in which index entries are sorted in accordance with ascending values of a particular predefined sort parameter in the set of predefined sort parameters; and
a descending index portion for the set of one or more predefined sort parameters in which index entries are sorted in accordance with descending values of the particular predefined sort parameter in the set of one or more predefined sort parameters.

11. The method of claim 1, wherein each respective operand is one of:
a filter scanner for a respective filter, wherein the filter scanner sequentially retrieves, in the sort order, identifiers for index entries that match the respective filter from an index portion associated with the respective filter; and
a logical-relationship scanner, wherein the logical-relationship scanner sequentially retrieves identifiers for index entries that match a logical relationship between index entries sequentially retrieved by a combination of two or more scanners each selected from the group consisting of a filter scanner and another logical-relationship scanner.

12. A search server system, comprising:
one or more processors;
memory; and
one or more programs, wherein the one or more programs are stored in the memory and configured to be executed by the one or more processors, the one or more programs including instructions for:
  receiving, from a client, a search query including filter criteria, wherein the filter criteria specify a plurality of operands including a first operand associated with one or more filters and a second operand associated with one or more filters, and a logical relationship between the plurality of operands, wherein the logical relationship between the plurality of operands is a Boolean NOT; and
  in response to the search query:
    identifying a plurality of index portions including a first set of one or more index portions matching the filter(s) of the first operand and a second set of one or more index portions matching the filter(s) of the second operand, wherein
      the plurality of index portions are identified in accordance with the plurality of operands and a criterion that index entries in the first set of index portion(s) and the second set of index portion(s) are sorted in a same sort order in accordance with identifiers for the index entries, and
      each of the plurality of index portions has a distinct combination of operands and sort order;
    identifying one or more matching entities that match the search query, wherein the identifying includes:
      (A) identifying a first set of one or more index entries in the first set of index portion(s) having a first identifier and matching the filter(s) of the first operand;
      (B) identifying, in the second set of index portion(s), a second set of one or more index entries in accordance with a second identifier, wherein
        the second identifier is closest to the first identifier in the sort order for index entries in the second set of index portion(s) that match the filter(s) of the second operand;
      (C) determining whether the first set of index portion(s) includes a respective set of one or more index entries that (i) match the filter(s) of the first operand, and (ii) having respective identifiers between the first identifier and the second identifier; and
      (D) in accordance with a determination that the first set of index portion(s) includes a respective set of one or more index entries (i) having a respective identifier between the first identifier and the second identifier and (ii) matching the filter(s) of the first operand,
        marking a respective entity associated with the respective identifier as matching the search query; and
    providing representations of one or more of the matching entities to the client.

13. The system of claim 12, further comprising instructions for, after identifying the first set of one or more index entries in the first set of index portion(s) having the first identifier:
determining whether the second set of index portion(s) includes a set of one or more index entries having the first identifier and matching the filter(s) of the second operand, and:
in accordance with a determination that the second set of index portion(s) includes a set of one or more index entries having the first identifier and matching the filter(s) of the second operand,
  continuing to process the search query without marking an entity associated with the first identifier as matching the search query; and
in accordance with a determination that the second set of index portion(s) does not include a set of one or more index entries having the first identifier and matching the filter(s) of the second operand,
  marking an entity associated with the first identifier as matching the search query.

14. The system of claim 12, further comprising instructions for, after identifying, in the second set of index portion(s), a second set of one or more index entries having the second identifier:

determining whether the first set of index portion(s) includes a set of one or more index entries having the second identifier and matching the filter(s) of the first operand; and in accordance with a determination that the first set of index portion(s) includes a set of one or more index entries having the second identifier and matching the filter(s) of the first operand, continuing to process the search query without marking an entity associated with the second identifier as matching the search query.

15. The system of claim 12, wherein the sort order is determined in accordance with sort criteria specified in the search criteria, the sort criteria including a set of one or more predefined sort parameters and corresponding sort directions.

16. The system of claim 12, wherein:

each filter specifies a property having a plurality of different possible values and a particular value of the property that matches the filter;

identifying a respective index portion for a respective operand that has a respective filter and one or more predefined sort parameters includes:

identifying an index that is sorted in accordance with the different possible values of a respective property of the respective filter and the one or more predefined sort parameters; and selecting, as the respective index portion, a portion of the identified index that includes all of the index entries having the particular value for the respective property that matches the filter.

17. The system of claim 12, wherein each respective operand is one of:

a filter scanner for a respective filter, wherein the filter scanner sequentially retrieves, in the sort order, identifiers for index entries that match the respective filter from an index portion associated with the respective filter; and a logical-relationship scanner, wherein the logical-relationship scanner sequentially retrieves identifiers for index entries that match a logical relationship between index entries sequentially retrieved by a combination of two or more scanners each selected from the group consisting of a filter scanner and another logical-relationship scanner.

18. A non-transitory computer readable storage medium storing one or more programs, the one or more programs comprising instructions, which when executed by a computer system with one or more processors, cause the computer system to:

receive, from a client, a search query including filter criteria, wherein the filter criteria specify a plurality of operands including a first operand associated with one or more filters and a second operand associated with one or more filters, and a logical relationship between the plurality of operands, wherein the logical relationship between the plurality of operands is a Boolean NOT; and in response to the search query:

identifying a plurality of index portions including a first set of one or more index portions matching the filter(s) of the first operand and a second set of one or more index portions matching the filter(s) of the second operand, wherein the plurality of index portions are identified in accordance with the plurality of operands and a criterion that index entries in the first set of index portion(s) and the second set of index portion(s) are sorted in a same sort order in accordance with identifiers for the index entries, and each of the plurality of index portions has a distinct combination of operands and sort order;

identifying one or more matching entities that match the search query, wherein the identifying includes:

(A) identifying a first set of one or more index entries in the first set of index portion(s) having a first identifier and matching the filter(s) of the first operand;

(B) identifying, in the second set of index portion(s), a second set of one or more index entries in accordance with a second identifier, wherein the second identifier is closest to the first identifier in the sort order for index entries in the second set of index portion(s) that match the filter(s) of the second operand;

(C) determining whether the first set of index portion(s) includes a respective set of one or more index entries that (i) match the filter(s) of the first operand, and (ii) having respective identifiers between the first identifier and the second identifier; and (D) in accordance with a determination that the first set of index portion(s) includes a respective set of one or more index entries (i) having a respective identifier between the first identifier and the second identifier and (ii) matching the filter(s) of the first operand, marking a respective entity associated with the respective identifier as matching the search query; and providing representations of one or more of the matching entities to the client.

19. The computer readable storage medium of claim 18, further comprising instructions which cause the computer system to, after identifying the first set of one or more index entries in the first set of index portion(s) having the first identifier:

determine whether the second set of index portion(s) includes a set of one or more index entries having the first identifier and matching the filter(s) of the second operand, and:

in accordance with a determination that the second set of index portion(s) includes a set of one or more index entries having the first identifier and matching the filter(s) of the second operand, continue to process the search query without marking an entity associated with the first identifier as matching the search query; and in accordance with a determination that the second set of index portion(s) does not include a set of one or more index entries having the first identifier and matching the filter(s) of the second operand, mark an entity associated with the first identifier as matching the search query.

20. The computer readable storage medium of claim 18, further comprising instructions which cause the computer system to, after identifying, in the second set of index portion(s), a second set of one or more index entries having the second identifier:

determine whether the first set of index portion(s) includes a set of one or more index entries having the second identifier and matching the filter(s) of the first operand; and in accordance with a determination that the first set of index portion(s) includes a set of one or more index entries having the second identifier and matching the filter(s) of the first operand, continue to process the search query without marking an entity associated with the second identifier as matching the search query.

21. The computer readable storage medium of claim 18, wherein the sort order is determined in accordance with sort criteria specified in the search criteria, the sort criteria including a set of one or more predefined sort parameters and corresponding sort directions.

22. The computer readable storage medium of claim 18, wherein:
- each filter specifies a property having a plurality of different possible values and a particular value of the property that matches the filter;
- identifying a respective index portion for a respective operand that has a respective filter and one or more predefined sort parameters includes:
  - identifying an index that is sorted in accordance with the different possible values of a respective property of the respective filter and the one or more predefined sort parameters; and
  - selecting, as the respective index portion, a portion of the identified index that includes all of the index entries having the particular value for the respective property that matches the filter.

23. The computer readable storage medium of claim 18, wherein each respective operand is one of:
- a filter scanner for a respective filter, wherein the filter scanner sequentially retrieves, in the sort order, identifiers for index entries that match the respective filter from an index portion associated with the respective filter; and
- a logical-relationship scanner, wherein the logical-relationship scanner sequentially retrieves identifiers for index entries that match a logical relationship between index entries sequentially retrieved by a combination of two or more scanners each selected from the group consisting of a filter scanner and another logical-relationship scanner.

* * * * *